(12) United States Patent
Widitora et al.

(10) Patent No.: US 9,192,977 B2
(45) Date of Patent: Nov. 24, 2015

(54) METHOD AND APPARATUS FOR PROVIDING METAL CONTAINER WITH LINING

(71) Applicant: Silgan Containers LLC, Woodland Hills, CA (US)

(72) Inventors: Alvin Widitora, Los Angeles, CA (US); Michael Gurka, Oconomowoc, WI (US); Michael Richards, Colton, CA (US); Dustin Lobner, Oconomowoc, WI (US); Phil Frisella, Dunedin, FL (US)

(73) Assignee: Silgan Containers LLC, Woodland Hills, CA (US)

( * ) Notice: Subject to any disclaimer, the term of this patent is extended or adjusted under 35 U.S.C. 154(b) by 309 days.

(21) Appl. No.: 13/834,865

(22) Filed: Mar. 15, 2013

(65) Prior Publication Data

US 2014/0271042 A1    Sep. 18, 2014

(51) Int. Cl.
*B21D 51/26*    (2006.01)

(52) U.S. Cl.
CPC ..................................... *B21D 51/26* (2013.01)

(58) Field of Classification Search
CPC ...... B21D 51/26; B21D 51/38; B29C 51/162; Y10S 425/06
USPC ............................................. 413/9, 58, 59, 69
See application file for complete search history.

(56) References Cited

U.S. PATENT DOCUMENTS

| 3,338,020 | A | * | 8/1967 | McGee ........................ 53/449 |
| 3,975,134 | A | | 8/1976 | Repenning |
| 4,127,430 | A | | 11/1978 | Davis |
| 4,342,183 | A | | 8/1982 | Gordon et al. |
| 4,982,872 | A | | 1/1991 | Avery |
| 5,954,217 | A | | 9/1999 | Brkovic et al. |

FOREIGN PATENT DOCUMENTS

JP      04-261837       9/1992

OTHER PUBLICATIONS

International Search Report and Written Opinion for International Application No. PCT/US2013/046890 dated Dec. 11, 2013, 16 pages.

* cited by examiner

*Primary Examiner* — Teresa M Ekiert
(74) *Attorney, Agent, or Firm* — Reinhart Boerner Van Deuren S.C.

(57) ABSTRACT

Embodiments of methods and apparatuses for providing a container with a lining are provided. A lining element is displaced into the interior of the container and coupled to the interior surfaces of the container to substantially cover the interior of the container.

25 Claims, 22 Drawing Sheets

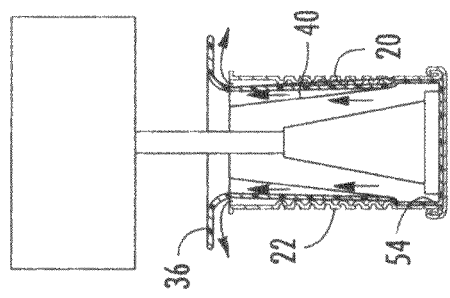
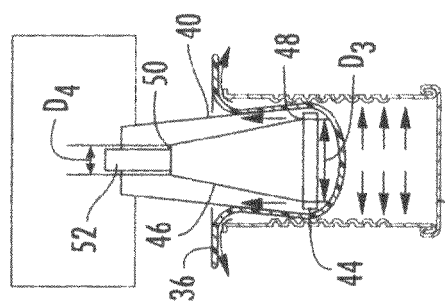
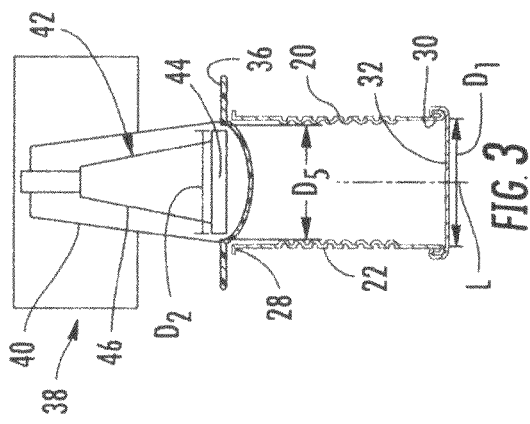
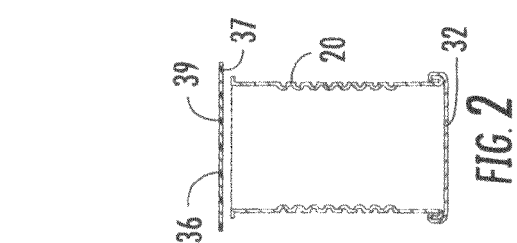
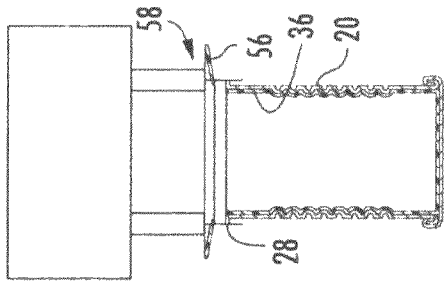
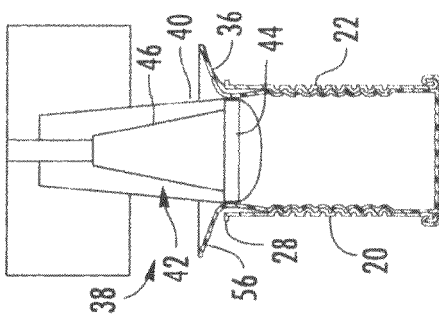
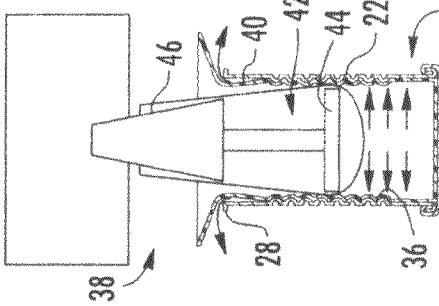
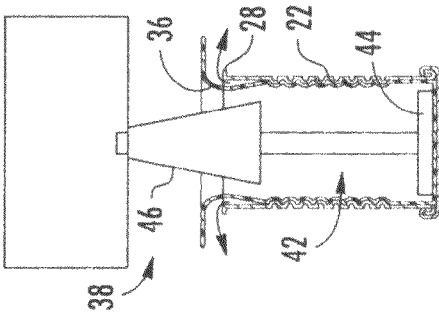
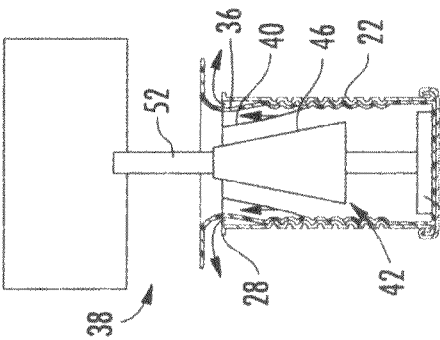

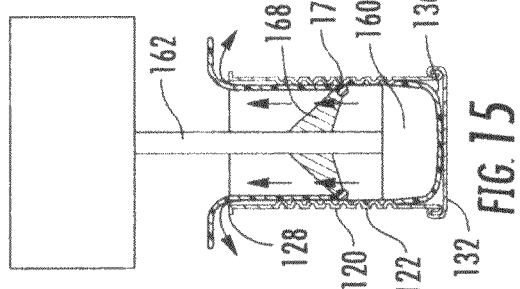
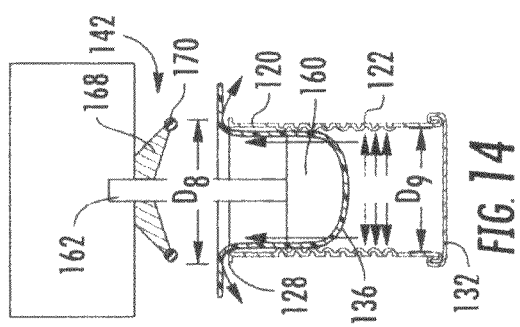
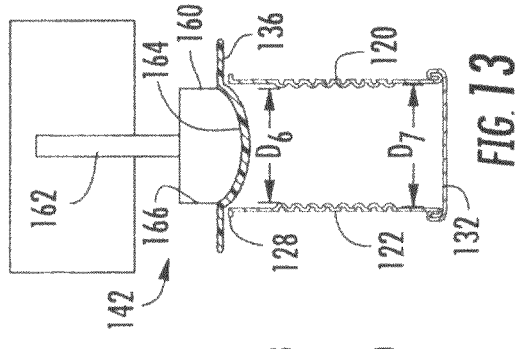
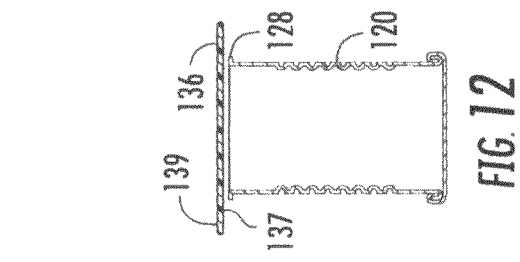
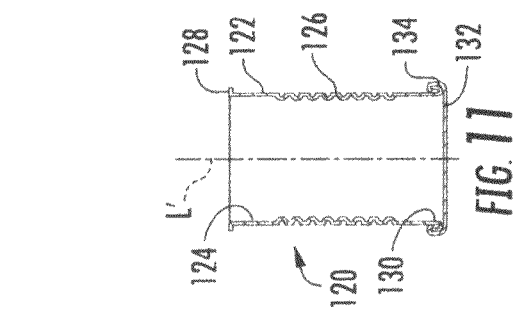
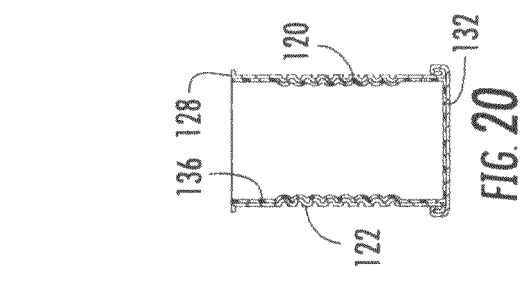
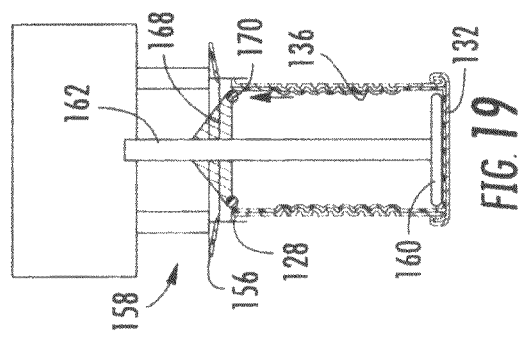
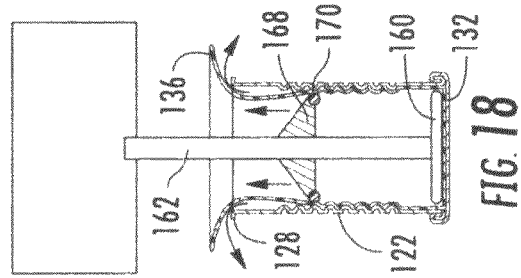
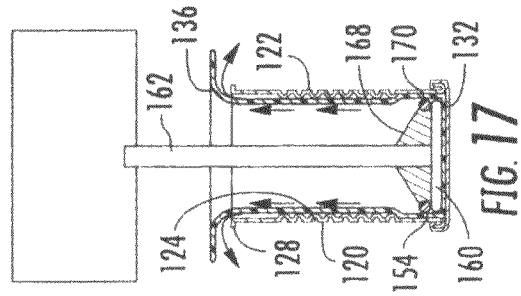
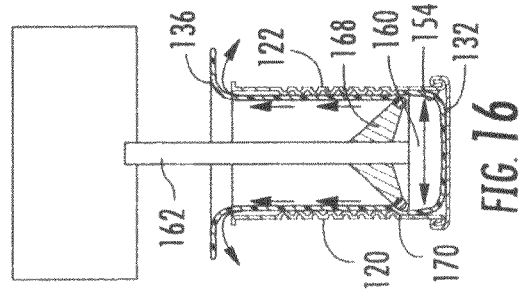

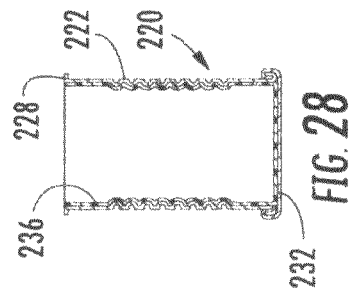
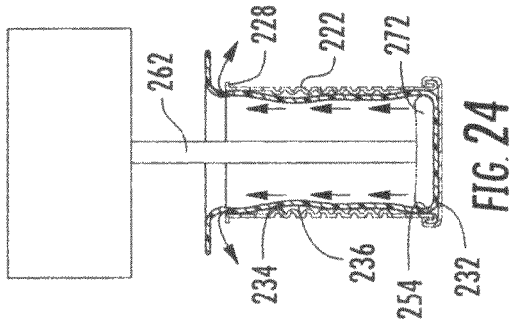
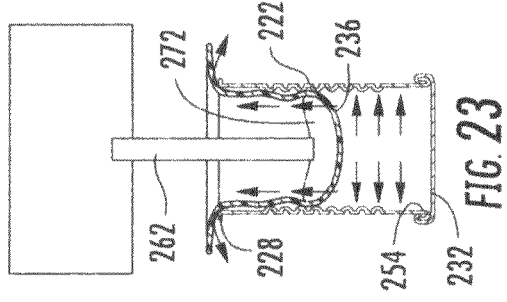
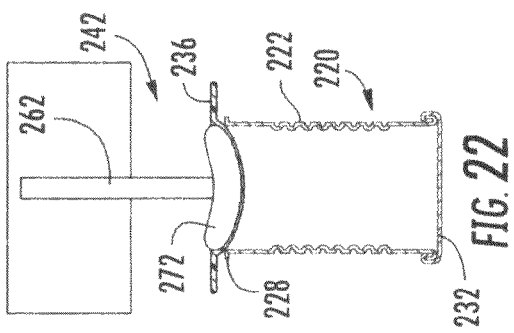
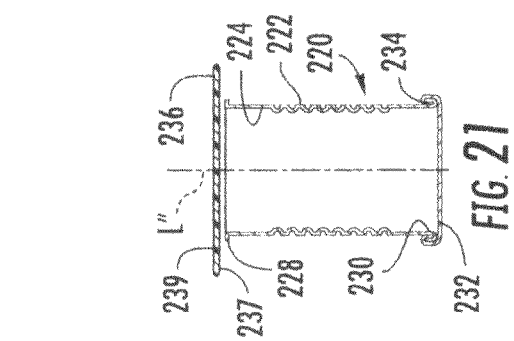
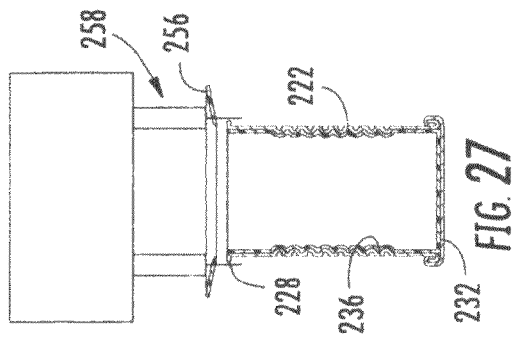
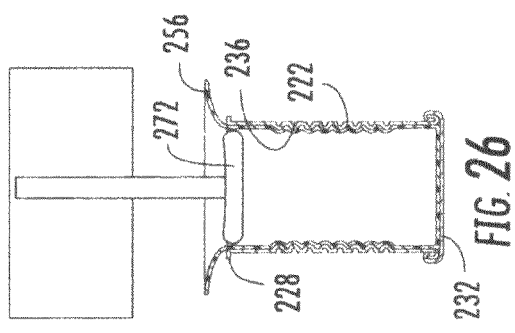
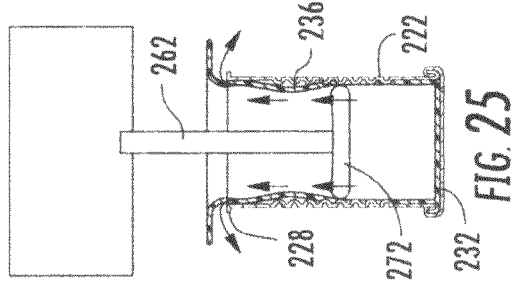

METHOD AND APPARATUS FOR PROVIDING METAL CONTAINER WITH LINING

BACKGROUND OF THE INVENTION

The present invention relates generally to the field of metal containers. The present invention relates more specifically to a method and apparatus for providing a metal container with a lining.

SUMMARY OF THE INVENTION

One embodiment of a method for providing a container includes providing a metal cylindrical sidewall and a metal can end double-seamed to the sidewall. The sidewall has an interior surface and an exterior surface. The sidewall extends from a first open end to a second closed end closed by the can end. The can end has an interior surface. The sidewall and the can end define an interior of the container. The method includes providing a liner sheet proximate the first end of the sidewall. The liner sheet includes a first surface and a second surface opposite the first surface. The method includes displacing the liner sheet toward the can end into the interior of the container. The method includes displacing air from between the can end and the liner sheet. The method includes displacing air from between the sidewall and the liner sheet outside of the container and applying the first surface of the liner sheet to the interior surface of the sidewall.

Another embodiment of a method of providing a container includes providing a metal container including a sidewall having an interior surface. The sidewall extends from a first open end to a second end. The metal container includes a can end having an interior surface. The can end is coupled to the sidewall closing the second end of the sidewall. The sidewall and the can end form an open-topped enclosure. The method includes providing a BPA-free film. The method includes adhering the BPA-free film to interior surfaces of the sidewall and the can end such that the film is substantially continuously applied to the interior surfaces of the sidewall and the can end.

An embodiment of an apparatus for applying a lining into a metal container, the metal container including a sidewall double-seamed to an can end, the container having a first open end and a second closed end, includes a film mechanism configured to provide a film. The film has a first and a second side opposite the first side. The apparatus includes a film displacement mechanism on the opposite side of the film as the metal container. The film displacement mechanism is displaceable from a location outside the metal container through the first open end to a location inside the metal container proximate the can end thereby displacing the film into the container. The displacement mechanism is further displaceable from the location proximate the can end to a location outside of the container. The displacement mechanism is configured to displace air from between the film and the sidewall such that the film is coupled to the sidewall.

Another embodiment of a method of providing a can includes providing a metal cylindrical sidewall and a metal can end double-seamed to the sidewall. The sidewall has an interior surface and an exterior surface. The sidewall extends from a first open end to a second end closed by the can end. The can end has an interior surface. The sidewall and the can end define an interior of the container. The method includes providing a liner sheet. The liner sheet has a first surface and a second surface opposite the first surface. The liner sheet has a first thickness. The liner sheet has a center portion. The liner sheet has a radial periphery. The method includes heating the container. The method includes heating the liner sheet. The method includes providing a displacement mechanism including a liner sheet displacement portion with a bottom portion and a sidewall. The method includes creating a vacuum proximate the liner sheet displacement portion configured to displace the radial periphery of the liner sheet toward the sidewall of the displacement mechanism. The method includes displacing the liner sheet displacement portion and the liner sheet into the interior of the container. The method includes expelling fluid from the liner sheet displacement portion displacing the liner sheet away from the sidewall of the liner sheet displacement portion toward the metal cylindrical sidewall.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIG. 2 is a cross-sectional view of the container and lining element of FIG. 1A taken along the line 2-2 in FIG. 1A.

FIGS. 3-10 illustrate an embodiment of an arrangement and mechanism for applying a lining element to the interior of the container and the steps in an embodiment of a method for applying the lining element to the interior of the container with the container shown in cross-section.

FIG. 11 is a cross-sectional view of a container according to an exemplary embodiment.

FIG. 12 is a cross-sectional view of an embodiment of a container with a lining element located above the open end of the container.

FIGS. 13-19 illustrate an embodiment of an arrangement and mechanism for applying the lining element to the interior of the container and the steps in an embodiment of a method for applying the lining element to the interior of the container with the container shown in cross-section.

FIG. 20 illustrates an embodiment of a container with a lining element applied to the interior of the container by the arrangement and mechanism of FIGS. 13-19.

FIG. 21 is a cross-sectional view of an embodiment of a container with an embodiment of a lining element located above the open end of the container.

FIGS. 22-27 illustrate an embodiment of an arrangement and mechanism for applying the lining element to the interior of the container and the steps in an embodiment of a method for applying the lining element to the interior of the container with the container shown in cross-section.

FIG. 28 is a cross-sectional view of an embodiment of a container with a lining element applied to the interior of the container by the arrangement and mechanism of FIGS. 22-27.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, various mechanisms and methods for providing various containers with lining are shown according to exemplary embodiments. Metal containers may be provided with non-metal lining to prevent contamination and/or degradation of contents that may be added to and/or stored in the container.

Figure 1:
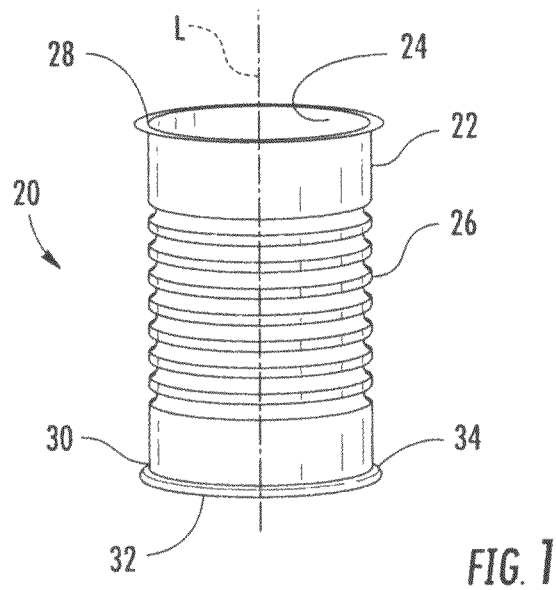
FIG. 1 is a perspective view of a container according to an exemplary embodiment.

Referring to FIG. 1, an embodiment of a metal container, shown as metal can 20 is illustrated. The can 20 includes a cylindrical sidewall 22 with an interior surface 24 and an exterior surface 26. The sidewall 22 extends from a first end 28 to a second end 30 along a longitudinal axis L. The can 20 also includes an end wall, illustrated in FIG. 1 as a can end 32, coupled to the second end 30 of the sidewall 22 by a double-seam 34 to seal the second end 30 of the sidewall 22. In one embodiment, sidewall 22 is formed by rolling a rectangular sheet of metal into a cylinder, welding the sheet at the abutting ends and then stretching the cylinder to a precise, desired diameter.

Figure 1A:
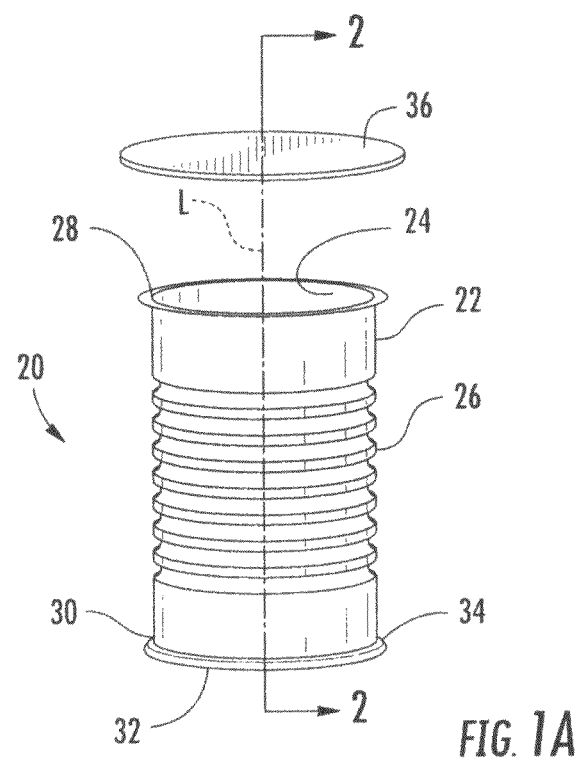
FIG. 1A is a perspective view of an embodiment of a container with an embodiment of a lining element above the container.

FIG. 1A illustrates a lining element, illustrated in FIG. 1A as a liner sheet 36, provided proximate the first open end 28 of the can 20 generally perpendicular to the longitudinal axis L of the sidewall 22. In one embodiment, the liner sheet 36 is generally round disk-shaped. In other embodiments, the liner sheet 36 may be any other suitable shape.

FIG. 2 is a cross-sectional view of the container and lining element of FIG. 1A taken along the line 2-2 in FIG. 1A. The lining element, illustrated in FIG. 2 as a liner sheet 36, is provided proximate the first open end 28 generally perpendicular to the longitudinal axis L of the sidewall 22. The liner sheet 36 includes a first side 37 proximate the can 20 and a second side 39 opposite the first side 37.

In one embodiment, adhesive is applied to the interior surface 24 of the sidewall 22 and the can end 32 before the liner sheet 36 is displaced into the can 20 to adhere the liner sheet 36 to the sidewall 22 and the can end 32. In another embodiment, adhesive is applied to the first side 37 of the liner sheet 36 proximate the can 20 to adhere the liner sheet 36 to the sidewall 22 and the can end 32. In another embodiment, the liner sheet 36 includes and is formed with an adhesive that may be activated, e.g., thermally activated, thermoset, etc., when the first side 37 of the liner sheet 36 is placed into contact with the can end 32 and the sidewall 22 to adhere the liner sheet 36 to the can end 32 and the sidewall 22. In other embodiments, any other suitable method of coupling the liner sheet 36 to the can end 32 and the sidewall 22 may be used.

With reference to FIGS. 3-11, a first embodiment of a method of and arrangement and mechanism for providing a can with lining is illustrated. In one embodiment, an apparatus 38 for lining the can 20 with the liner sheet 36 is provided. The apparatus 38 includes a bladder 40. The bladder 40 is configured to be filled with fluid (e.g., air, etc.) to expand the bladder 40. The apparatus 38 also includes a displacement mechanism 42 located inside the bladder 40 and configured to displace the bladder 40 into the interior of the can 20.

In one embodiment, the displacement mechanism 42 includes a disc-shaped lower portion 44 with a diameter $D_2$ less than the interior diameter $D_1$ of the can 22 proximate the second end 30. The displacement mechanism 42 also includes a fluid dispensing portion 46. In one embodiment, the fluid dispensing portion 46 is configured to dispense fluid in a direction generally parallel with longitudinal axis L of the sidewall 22 towards the can end 32. Additionally, in one embodiment, the fluid dispensing portion 46 is configured to dispense fluid in various angular directions from approximately 0 degrees to less than 180 degrees relative to the longitudinal axis L.

In one embodiment, the fluid dispensing portion 46 has a generally truncated cone shape, with a diameter $D_3$ (shown in FIG. 4) at a first end 48 proximate the lower portion 44. The fluid dispensing portion 46 tapers inward along the direction parallel with the longitudinal axis L away from the can end 32 to a diameter $D_4$ at a second end 50 distal from the lower portion 44.

In one embodiment, the bladder 40 and the displacement mechanism 42 are displaceable from a first location above the liner sheet 36 and the first end 28 of the can 20 downwardly into the interior of the can 20. Additionally, as will be further described below, in one embodiment the fluid dispensing portion 46 and the lower portion 44 are displaceable independently of one another. The fluid dispensing portion 46 and the portion 44 are supported by a support 52.

In one embodiment, the can 20 is heated prior to displacement of the liner sheet 36 into the can 20. In one embodiment, the can 20, and air located within the can 20, is heated, prior to displacement of the liner sheet 36 into the can 20. In one embodiment the can 20, and air located within the can 20 is heated to a temperature T. In one embodiment, the temperature T is greater than the maximum temperature to which the can will be subjected to during processing (e.g., maximum temperature to which the can 20 is heated during lining of the can, filing of the can (e.g., hot fill, etc.), sealing of the can, heating or retort of the filled can, etc.). In another embodiment, the temperature T is approximately equal to the maximum temperature to which the can will be subjected to during processing (e.g., maximum temperature to which the can 20 is heated during lining of the can, filing of the can (e.g., hot fill, etc.), sealing of the can, heating or retort of the filled can, etc.). In one embodiment, the can 20, and the air within the can 20, is heated, prior to displacement of the liner sheet 36 into the can 20, to a temperature below the temperature of reflow (e.g, below the melting point of the material from which the sidewall of the can is formed, etc.). In another embodiment, the can 20, and the air within the can 20, is heated, prior to displacement of the liner sheet 36 into the can 20, with the can being heated to a temperature between approximately 200° F. and approximately 300° F. In another embodiment, the can 20, and the air within the can 20, is heated, prior to displacement of the liner sheet 36 into the can 20, with the can being heated to approximately 265° F.

As is illustrated in FIG. 3, in one embodiment, the bladder 40 is inflated such that the diameter $D_5$ of the bladder 40 proximate the lower portion 44 of the displacement mechanism 42 is less than the diameter D1 of the sidewall 22 proximate the second end 30. The displacement mechanism 42 displaces the bladder 40 into contact with the liner sheet 36 and displaces the liner sheet 36 into the interior of the can 20 through the first open end 28.

With reference to FIG. 4, as the displacement mechanism 42, the bladder 40, and the liner sheet 36 are displaced into the interior of the can 20, air within the interior of the can 20 is forced downward toward the can end 32 and radially outwardly toward the sidewall 22 and escapes past the bladder 40 and out of the can 20 through the first open end 28. As is illustrated, in one embodiment, the radially outer portion of the liner sheet 36 remains outside of the can 20 while the radially central portion of the liner sheet 36 stretches and or slides toward the can end 32.

With reference to FIG. 5, in one embodiment, when the liner sheet 36 reaches the can end 32, the fluid dispensing portion 46 dispenses fluid expanding the portion of the bladder 40 proximate the can end 32, forcing the liner sheet 36 into contact with the can end 32 and the sidewall 22, including the corner 54 where the interior surface 24 of the sidewall 22 and the can end 32 meet. The adhesive of the liner sheet 36 is activated by contact with the heated can end 32 and the sidewall 22 and adheres to the can end 32 and the sidewall 22.

In one embodiment, the fluid dispensing portion 46 dispensing fluid expanding the portion of the bladder 40 proximate the can end 32 also forces air between the liner sheet 36 and the sidewall 22 to exit the interior of the can 20 out the first open end 28.

With reference to FIG. 6, in one embodiment, while the lower portion 44 of the displacement mechanism 42 remains proximate the can end 32, the fluid dispensing portion 46 continuing to dispense fluid is retracted away from the can end 32 toward the first open end 28 along the support 52. As the fluid dispensing portion 46 is retracted, the portions of the bladder 40 proximate the first open end 28 are urged toward the sidewall 22 displacing the liner sheet 36 toward the sidewall 22 and forcing air between the liner sheet 36 and the sidewall 22 to exit the interior of the can 20. As the liner sheet 36 contacts the sidewall 22, the adhesive is activated and the liner sheet 36 is adhered to the sidewall 22.

With reference to FIG. 7, in one embodiment, while the lower portion 44 of the displacement mechanism 42 remains proximate the can end 32, the fluid dispensing portion 46 continues to be withdrawn to and at least partially through the first open end 28 continuing to force air from between the liner sheet 36 and the sidewall 22 and to place the liner sheet 36 into contact with the sidewall 22 with the adhesive adhering the liner sheet 36 to the sidewall 22.

With reference to FIG. 8, in one embodiment, when the fluid dispensing portion 46 has been withdrawn through the first open end 28, the bladder 40 is deflated so that it no longer contacts the liner sheet 36 which is adhered to the sidewall 22 and the lower portion 44 of the displacement mechanism 42 and the bladder 40 are withdrawn from the can 20 toward the first open end 28, with the lower portion 44 of the displacement mechanism 42 being displaced toward the fluid dispensing portion 46.

As is illustrated in FIG. 9, in one embodiment, the lower portion 44 of the displacement mechanism 42 reaches the fluid dispensing portion 46, and the bladder 40 and the displacement mechanism 42 are withdrawn from the can 20. In one embodiment, an excess portion 56 of the liner sheet 36 remains outside of the can 20. In one embodiment, as is illustrated in FIG. 10, the excess portion 56 is removed with a cutting mechanism 58. The can 20 is illustrated in FIG. 10 with the liner sheet 36 applied to the interior of the can 20 by an embodiment of the arrangement and mechanism of FIGS. 3-9.

In one embodiment, a sufficient portion of the liner sheet 36 remains outside of the can 20 to be included in a double-seam between a cover (not illustrated) and the sidewall 22 to close the first open end 28 upon filling of the can 20. While the cutting mechanism 58 is illustrated in FIG. 10 with two cutting portions, in other embodiments, other cutting mechanisms may be used. In other embodiments, any suitable mechanism for removing the excess portion 56 of the liner sheet 36 may be used.

In one embodiment, as the can 20 cools, any air that may remain between the liner sheet 36 and the sidewall 22 and/or between the liner sheet 36 and the can end 32, including air located proximate the corner 54, may reduce in volume thus creating a vacuum tending to urge the liner sheet 36 toward the sidewall 22 and the can end 32. Additionally, in one embodiment, by heating the can 20 and the air inside the can 20 to a temperature greater than or equal to the highest temperature to which the can 20 will be subjected during processing (e.g., maximum temperature to which the can 20 is heated during lining of the can, filing of the can (e.g., hot fill, etc.), sealing of the can, heating or retort of the filled can, etc.) prior to placing the liner sheet 36 inside the can 20, any air that may remain trapped between the liner sheet 36 and the sidewall 22 and/or between the liner sheet 36 and the can end 32 may not expand to a volume greater than the volume of the trapped air when the liner sheet 36 is applied to the sidewall 22 and the can end 32.

In one embodiment, the displacement mechanism 42 includes a piston. In one embodiment, the lower portion 44 is a disc-shaped portion fixedly coupled to the piston. In one embodiment, the fluid dispensing portion includes a generally cone-shaped exterior including a plurality of apertures configured to dispense fluid, with the fluid dispensing portion configured to be displaceable along the piston independently of the disc-shaped portion. In other embodiments, the displacement mechanism 42 may include other suitable apparatus.

FIG. 11 illustrates a cross-sectional view of another embodiment of a can 120. The can 120 includes a generally cylindrical sidewall 122 with an interior surface 124 and an exterior surface 126. The sidewall 122 extends along a longitudinal axis L' from a first open end 128 to a second end 130. The second end 130 is closed by a can end 132 which is coupled to the second end 130 of the sidewall 122 by a double-seam 134.

With reference to FIG. 12, in one embodiment, a lining element, illustrated in FIG. 12 as a liner sheet 136, is provided proximate the first open end 128 of the can 120. The liner sheet 136 includes a first side 137 proximate the first open end 128 of the can 120 and a second side 139 opposite the first side 137. In one embodiment, the can 120 may be heated prior to displacing the liner sheet 136 into the can 120. In some embodiments, mechanisms for adhering the liner sheet 136 to the can end 132 and the sidewall 122 similar to those mechanisms described with regard to the embodiment described above may be used. In other embodiments, any other suitable mechanism of coupling the liner sheet 136 to the can end 132 and the sidewall 122 may be used.

In one embodiment, the can 120 is heated prior to displacement of the liner sheet 136 into the can 120. In one embodiment, the can 120, and air located within the can 120, is heated, prior to displacement of the liner sheet 136 into the can 120, with the can being heated to the maximum temperature to which the can will be subjected during processing (e.g., maximum temperature to which the can 120 is heated during lining of the can, filing of the can (e.g., hot fill, etc.), sealing of the can, heating or retort of the filled can, etc.). In one embodiment, the can 120, and the air within the can 120, is heated, prior to displacement of the liner sheet 136 into the can 120, to a temperature below the temperature of tin reflow. In another embodiment, the can 120, and the air within the can 120, is heated, prior to displacement of the liner sheet 136 into the can 120, with the can being heated to a temperature between approximately 200° F. and approximately 300° F. In another embodiment, the can 120, and the air within the can 120, is heated, prior to displacement of the liner sheet 136 into the can 120, with the can being heated to approximately 265° F.

With reference to FIG. 13, in one embodiment, a displacement mechanism 142 for displacing the liner sheet 136 into the can 120 through the first open end 128 is illustrated. The displacement mechanism 142 includes a flexible bladder 160 coupled to a displaceable piston 162. The piston 162 displaces the bladder 160 downwardly contacting the liner sheet 136 and displacing the liner sheet 136 through the first open end 128 and into the can 120.

In one embodiment, the bladder 160 is shaped to be received through the first open end 128 of the can 120, e.g., in one embodiment for a generally round can, the bladder is generally round when viewed from above, etc. In one embodiment, the bladder 160, when it is inserted through the first open end 128, has a rounded bottom portion 164 and a generally cylindrical sidewall 166 generally parallel with the sidewall 122 of the can 120, the generally cylindrical sidewall 166 extending upwardly from the rounded bottom portion 164. In one embodiment, the sidewall 166 has a diameter $D_6$ less than the diameter $D_7$ of the sidewall 122 of the can 120.

With reference to FIG. 14, in one embodiment, the bladder 160 is displaced downwardly through the first open end 128 and into the can 120, thereby displacing the liner sheet 136 into the can 120 and toward the can end 132. In one embodiment, the displacement mechanism 142 also includes a generally conical sealing mechanism 168 displaceable along the piston 162 independent of the bladder 160 (sealing mechanism 168 shown in cross-section taken along a plane with the longitudinal axis L') for ease of viewing. The sealing mechanism 168 includes at its lower end a flexible sealer, illustrated in FIG. 14 as a sealing O-ring 170.

In one embodiment, the sealing mechanism 168 has a diameter $D_8$ at the O-ring 170 that is greater than the diameter $D_7$ of the can 120. With reference to FIG. 15, when the bladder 160 reaches the can end 132, the sealing mechanism 168 is displaced through the first open end 128 of the can 120 downwardly toward the can end 132. To do so, in one embodiment, the sealing mechanism 168 and the O-ring 170 are displaced inwardly such that the sealing mechanism 168 can be received into the can 120.

With reference to FIG. 16, the sealing mechanism 168 is displaced along the piston 162 toward the bladder 160 and upon reaching the bladder 160 forces the bladder 160 downwardly toward the can end 132 and outwardly toward the sidewall 122, which in turn forces the liner sheet 136 downwardly toward the can end 132 and outwardly toward the sidewall 122.

With reference to FIG. 17, in one embodiment, when the sealing mechanism 168 reaches the bladder 160 proximate the can end 132, the sealing mechanism 168 flattens the bladder 160 and causes it to expand outwardly toward the sidewall 122 and displaces the liner sheet 136 outwardly toward the sidewall 122, including into the corner 154 where the interior surface 124 of the sidewall 122 and the can end 132 meet. The sealing mechanism 168 is displaced into a second configuration in which the bottom portion of the sealing mechanism is flattened such that the bottom of the truncated cone shape is displaced upwardly, but, in one embodiment, with the sealing mechanism 168 being within the can 120, the sealing mechanism is prevented from farther radial outward expansion by the sidewall 122 of the can 120. Therefore, in one embodiment, the O-ring 170 is compressed and force is provided outwardly forcing the liner sheet 136 against the sidewall 122 and forcing air from between the liner sheet 136 and the sidewall 122 outwardly through the first open end 128.

As is illustrated in FIG. 18, the sealing mechanism 168 is displaced upwardly along the piston 162 toward the first open end 128, forcing the liner sheet 136 against the sidewall 122 and forcing air from between the liner sheet 136 and the sidewall 122. The liner sheet 136 contacting the sidewall 122 is coupled to the sidewall 122. As the sealing mechanism 168 is displaced toward the first open end 128, the bladder 160 remains proximate the can end 132.

As is illustrated in FIG. 19, in one embodiment, once the sealing mechanism 168 has reached the first open end 128 and the liner sheet 136 has been adhered to the sidewall 122 along the longitudinal length of the sidewall 122 and to the can end 132, a cutting mechanism 158 removes an excess portion 156 of the liner sheet 136 extending from the first open end 128 of the can 120 and the piston 162 retracts the bladder 160 and the sealing mechanism 168 out of the can 120 through the first open end 128.

With reference to FIG. 20, in one embodiment, the can 120 is provided with the liner sheet 136 adhered to the sidewall 122 and the can end 132 substantially covering the interior of the can 120. In one embodiment, a sufficient portion of the liner sheet 136 remains outside of the can 20 to be included in a double-seam between a cover (not illustrated) and the sidewall 122 to close the first open end 128 upon filling of the can 120. While the cutting mechanism 158 is illustrated in FIG. 19 with two cutting portions, in other embodiments, other cutting mechanisms may be used. In other embodiments, any suitable mechanism for removing the excess portion 156 of the liner sheet 136 may be used. In one embodiment, the liner sheet is of sufficient dimension, e.g., thinness, so as not to interfere with sealing the first open end 128 of the can 120 by double-seaming a can end to the sidewall 122 upon filling of the can 120.

In one embodiment, as the can 120 cools, any air that may remain between the liner sheet 136 and the sidewall 122 or between the liner sheet 136 and the can end 132, including air located proximate the corner 154, may reduce in volume thus creating a vacuum tending to urge the liner sheet 136 toward the sidewall 122 and the can end 132.

While the sealing mechanism 168 is illustrated with a first shape, in other embodiments, other generally truncated cone shaped sealing mechanisms may be provided. In other embodiments, sealing mechanisms of other suitable shapes may be provided. In one embodiment, a sealing mechanism may include a single, truncated cone shaped sheet displaceable between a first, inward configuration for insertion into a can and a second, outward configuration for applying force outwardly to a sidewall of a can to urge a liner sheet toward the sidewall and remove air from between the liner sheet and the sidewall, during, for example, withdrawal of the sealing mechanism from the can. In other embodiments, other suitable shapes and configurations of sealing mechanisms may be provided.

With reference to FIG. 21, in one embodiment, a can 220 includes a generally cylindrical sidewall 222 with an interior surface 224 and an exterior surface 226. The sidewall 222 extends along a longitudinal axis L" from a first open end 228 to a second end 230. The second end 230 is closed by a can end 232 which is coupled to the second end 230 of the sidewall 222 by a double-seam 234.

With further reference to FIG. 21, in one embodiment, a lining element, illustrated in FIG. 21 as a liner sheet 236, is provided proximate the first open end 228 of the can 220. The liner sheet 236 includes a first side 237 proximate the first open end 228 and a second side 239 opposite the first side 239. In one embodiment, the can 220 may be heated prior to displacing the liner sheet 236 into the can 220. In some embodiments, mechanisms for adhering the liner sheet 236 to the can end 232 and the sidewall 222 similar to those mechanisms described with regard to the first embodiment described above may be used. In other embodiments, any other suitable mechanism of coupling the liner sheet 236 to the can end 232 and the sidewall 222 may be used.

In one embodiment, the can 220 is heated prior to displacement of the liner sheet 236 into the can 220. In one embodiment, the can 220, and air located within the can 220, is heated, prior to displacement of the liner sheet 236 into the can 220, with the can being heated to the maximum temperature to which the can will be subjected during processing (e.g., maximum temperature to which the can 220 is heated during lining of the can, filing of the can (e.g., hot fill, etc.), sealing of the can, heating or retort of the filled can, etc.). In one embodiment, the can 220, and the air within the can 220, is heated, prior to displacement of the liner sheet 236 into the can 220, to a temperature below the temperature of tin reflow. In another embodiment, the can 220, and the air within the can 220, is heated, prior to displacement of the liner sheet 136 into the can 220, with the can being heated to a temperature between approximately 200° F. and approximately 300° F. In another embodiment, the can 220, and the air within the can 220, is heated, prior to displacement of the liner sheet 236 into the can 220, with the can being heated to approximately 265° F.

With reference to FIG. 22, in one embodiment, a displacement mechanism 242 configured to displace the liner sheet 236 into the can 220 through the first open end 228 is provided. The displacement mechanism 242 includes a generally disc-shaped plunger portion 272 coupled to a piston 262. The disc-shaped plunger portion 272 has an outer diameter greater than the diameter of the sidewall 222 of the container 220.

In one embodiment, the disc-shaped plunger portion 272 is generally circular. In other embodiments, plunger portions of other suitable shapes may be provided.

As is illustrated in FIG. 22, in one embodiment, the plunger portion 272 is displaced downwardly into the can 220 through the first open end 228. The radial periphery of the plunger portion 272 contacts the sidewall 222 and is displaced upwardly and inwardly. In one embodiment, the plunger portion 272 is flexibly displaceable upwardly and inwardly. As the plunger portion 272 is displaced into the can 220, the liner sheet 236 is displaced through the first open end 228 into the can 220.

As is illustrated in FIG. 23, the plunger portion 272 is displaced toward the can end 232 displacing the liner sheet 236 toward the can end 232.

With reference to FIG. 24, the plunger portion 272 displaces the liner sheet 236 into contact with the can end 232 and the liner sheet 236 is adhered to the can end 232 (e.g., adhesive between the liner sheet 236 and the can end 232 is activated by the heated can end 232, etc.). In one embodiment, the plunger portion 272 is then moved toward the first open end 228 of the can 220. In one embodiment, the plunger portion 272 resists flexing downwardly and inwardly proximate its radial periphery. Thus, the plunger portion 272 urges the liner sheet 236 outwardly against the interior surface 234 of the sidewall 222, adhering the liner sheet 236 to the sidewall 222. In one embodiment, the radial peripheral portion of the plunger portion 272 is compressed as the plunger portion 272 is displaced toward the first open end 228.

With reference to FIG. 25, in one embodiment, as the plunger portion 272 is withdrawn toward the first open end 228, it urges the liner sheet 236 toward the sidewall 222 and forces air out from between the liner sheet 236 and the sidewall 222 out of the first open end 228 to promote adhering of the liner sheet 236 with the sidewall 222, until the plunger portion 272 reaches the first open end 228 and is withdrawn from the can.

With reference to FIG. 27, in one embodiment, an excess portion 256 of the liner sheet 236 proximate the first open end 228 of the can 220 is removed by a cutting mechanism 258. In one embodiment, a sufficient portion of the liner sheet 236 remains outside of the can 220 to be included in a double-seam between a cover (not illustrated) and the sidewall 222 to close the first open end 228 upon filling of the can 220. While the cutting mechanism 258 is illustrated in FIG. 27 with two cutting portions, in other embodiments, other cutting mechanisms may be used. In other embodiments, any suitable mechanism for removing the excess portion 256 of the liner sheet 236 may be used.

With reference to FIG. 28, in one embodiment, the method described above provides a can 220 with a liner sheet 236 adhered to the sidewall 222 and end 232 covering the interior of the can 220.

In one embodiment, as the can 220 cools, any air that may remain between the liner sheet 236 and the sidewall 222 or between the liner sheet 236 and the can end 232, including air located proximate the corner 254, may reduce in volume thus creating a vacuum tending to urge the liner sheet 236 toward the sidewall 222 and the can end 232.

Figure 29:
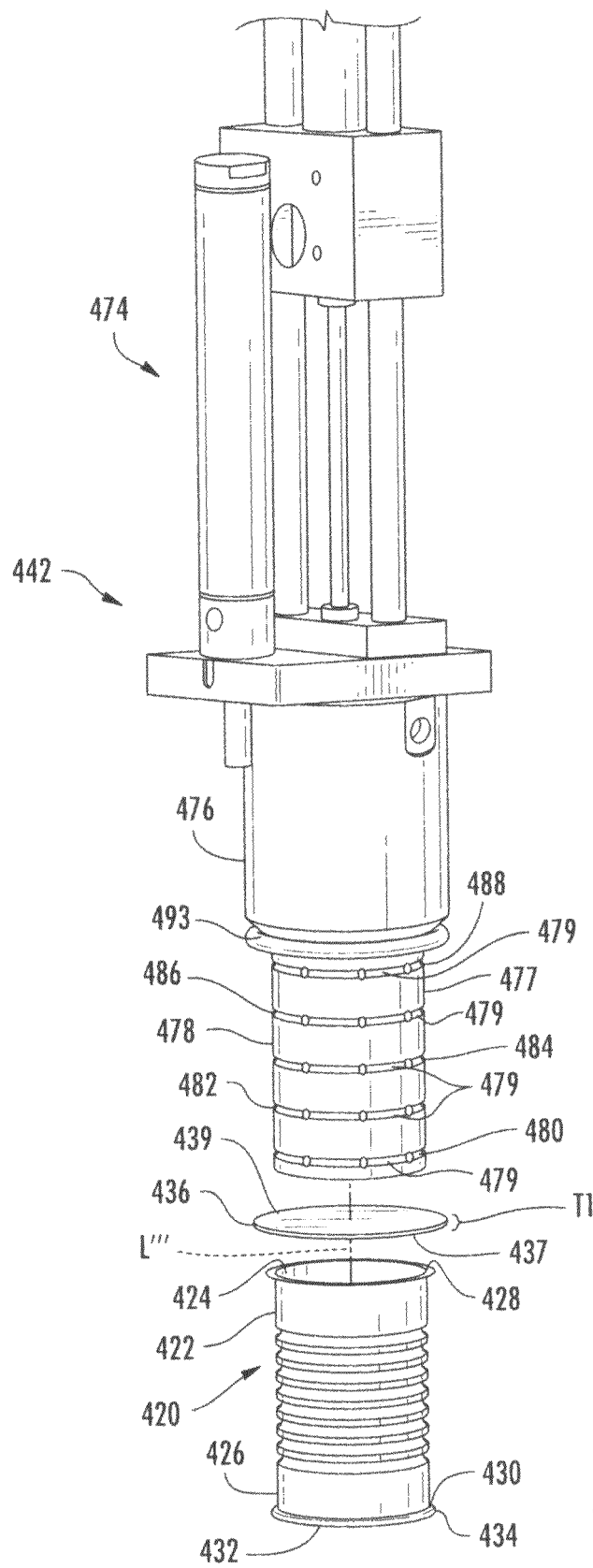
FIG. 29 is an embodiment of an arrangement and mechanism for applying an embodiment of a lining element to the interior of a container located above an embodiment of a container and an embodiment of a lining element.

FIG. 29 illustrates a perspective view of another embodiment of a container, shown as a can 420. The can 420 includes a generally cylindrical sidewall 422 with an interior surface 424 and an exterior surface 426. The sidewall 422 extends along a longitudinal axis L''' from a first open end 428 to a second end 430. The second end 430 is closed by a can end 432 which is coupled to the second end 430 of the sidewall 422 by a double-seam 434.

With further reference to FIG. 29, in one embodiment, a lining element, illustrated in FIG. 29 as a liner sheet 436, is provided proximate the first open end 428 of the can 420. The liner sheet 436 includes a first side 437 proximate the first open end 428 of the can 420 and a second side 439 opposite the first side 437. The liner sheet 436 has a thickness T1.

In one embodiment, adhesive may be applied to the first side 437 of the liner sheet 436 prior to displacing the liner sheet 436 into the can 420. In other embodiments, other suitable mechanisms for adhering the liner sheet 436 to the interior surface of the can end 432 and the interior surface 424 of the sidewall 422, e.g., mechanisms similar to those described with regard to the embodiments above, etc., may be used.

As described above with respect to other embodiments, in one embodiment, the can 420 is heated prior to displacement of the liner sheet 436 into the can 420. In one embodiment, the can 420 is heated by induction heating. In other embodiments, the can 420 may be heated by other suitable mechanisms. In one embodiment, the can 420, prior to displacement of the liner sheet 436 into the can 420, is heated to the maximum temperature to which the can will be subjected during processing (e.g., maximum temperature to which the can 420 is heated during lining of the can, filing of the can (e.g., hot fill, etc.), sealing of the can, heating or retort of the filled can, etc.). In one embodiment, the can 420 is heated, prior to displacement of the liner sheet 436 into the can 420, to a temperature below the temperature of tin reflow. In another embodiment, the can 120 is heated, prior to displacement of the liner sheet 436 into the can 420, to a temperature between approximately 200° F. and approximately 300° F. In another embodiment, the can 420 is heated, prior to displacement of the liner sheet 436 into the can 420, to approximately 265° F.

In one embodiment, the liner sheet 436 is heated prior to deformation by a vacuum, as will be further described below, and prior to being located in the can 420. In one embodiment, the liner sheet 436 is heated by infrared heating. In other embodiments, other suitable heating mechanisms and/or methods may be used to heat the liner sheet 436. In one embodiment, the liner sheet 436 is heated above its glass transition temperature.

With further reference to FIG. 29, in one embodiment, a displacement mechanism 442 configured to deform the liner sheet 436 displace the liner sheet 436 into the can 420 through the first open end 428 is illustrated. The displacement mechanism 442 includes an upper portion 474 and a lower portion 476, e.g., mandrel, etc., coupled to the upper portion 474. The upper portion 474 is configured to displace the lower portion 476 axially upwardly and downwardly toward and away from the can end 432 of the can 420.

With reference to FIG. 29, in one embodiment, the lower portion 476 of the displacement mechanism 442 includes a liner displacement portion 478 configured to displace the liner sheet into the can 420. In one embodiment, the liner displacement portion 478 is sized to be received into the interior of the can 420. For example, in the illustrated embodiment, the cylindrical can 420 is generally circular in radial cross-section. The liner displacement portion 478 is also generally circular in radial cross-section with a diameter smaller than the diameter of the can 420 to allow the liner displacement portion 478 and the liner sheet 436 to pass through the first open end 428 and into the interior of the can 420 toward the can end 432.

In one embodiment, the liner displacement portion 478 has an outer surface 477. Defined in the outer surface 477 are a plurality of grooves 479 spaced apart axially along the outer surface 477.

With further reference to FIG. 29, in one embodiment, the liner displacement portion 478 includes a plurality of apertures arranged in a plurality of rows axially spaced apart, in the illustrated embodiment, five rows 480, 482, 484, 486, and 488. In one embodiment, the rows 480, 482, 484, 486, and 488 each are generally aligned with one of the grooves 479. In one embodiment, apertures in each row are axially spaced apart and radially aligned with respective apertures in rows above, below, or above and below. In other embodiments, the apertures in each of the rows may be radially offset from respective apertures in rows above and/or below. In other embodiments, other suitable configurations of apertures may be provided.

Figure 30:
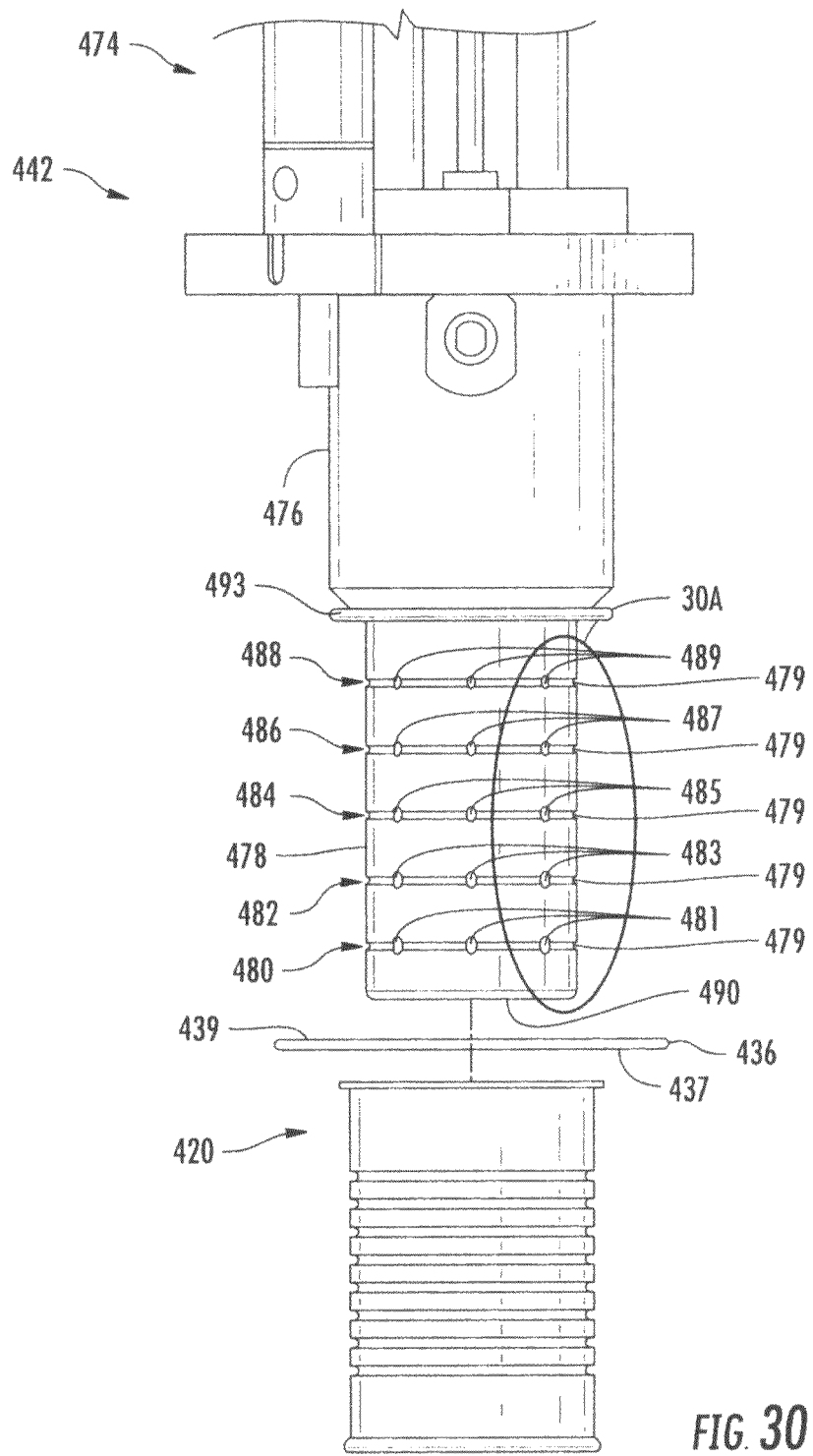
FIG. 30 is an embodiment of an arrangement and mechanism for applying an embodiment of a lining element to the interior of a container located above an embodiment of a container and an embodiment of a lining element.
Figure 30A:
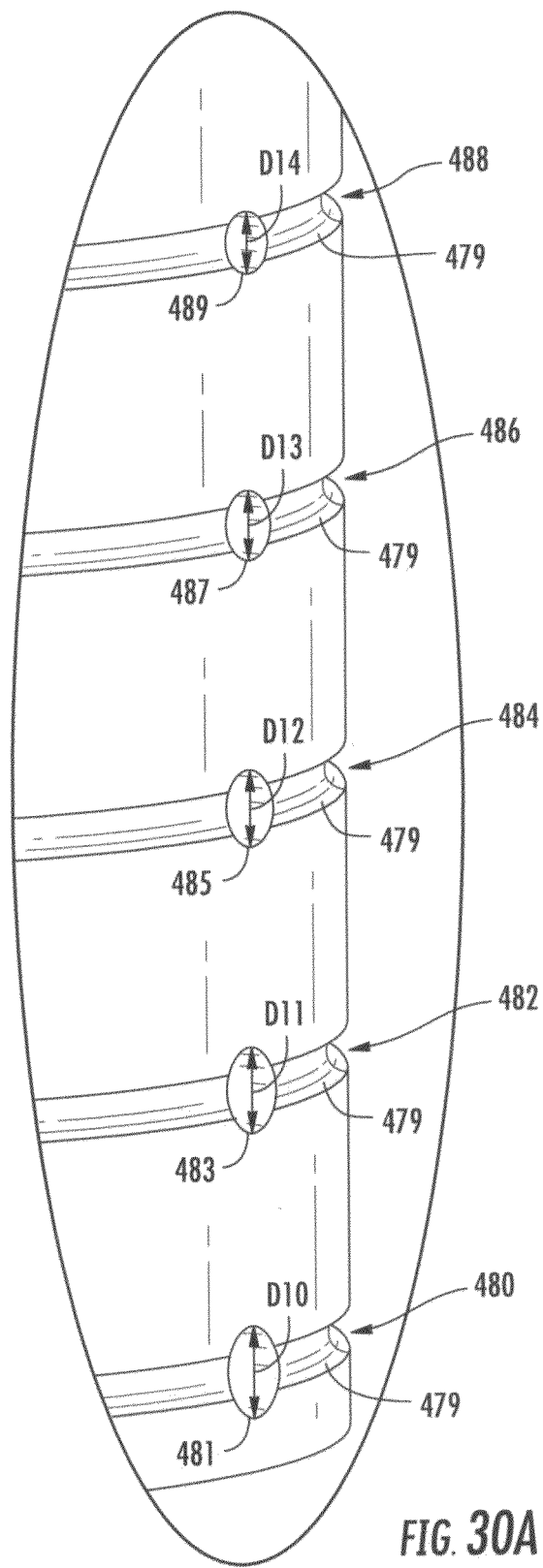
FIG. 30A is a detail view of the area 30A in FIG. 30.

With reference to FIGS. 30 and 30A, in one embodiment, the liner displacement portion 478 includes a first row 480 of apertures 481 proximate a lower end 490 of the liner displacement portion 478 proximate the liner sheet 436. The apertures 481 each have a diameter D10. The liner displacement portion 478 also includes a second row 482 of apertures 483 located above the first row 480. The apertures 483 each have a diameter D11. In one embodiment, the diameter D11 of the apertures 483 is less than the diameter D10 of the apertures 481. The liner displacement portion 478 also includes a third row 484 of apertures 485 located above the second row 482. The apertures 485 each have a diameter D12. In one embodiment, the diameter D12 of the apertures 485 is less than the diameter D11 of the apertures 483. The liner displacement portion 478 also includes a fourth row 486 of apertures 487 located above the third row 484. The apertures 487 each have a diameter D13. In one embodiment, the diameter D13 of the apertures 487 is less than the diameter D12 of the apertures 485. The liner displacement portion 478 also includes a fifth row 488 of apertures 489 located above the fourth row 486. The apertures 489 each have a diameter D14. In one embodiment, the diameter D14 of the apertures 489 is less than the diameter D13 of the apertures 487.

Figure 31:
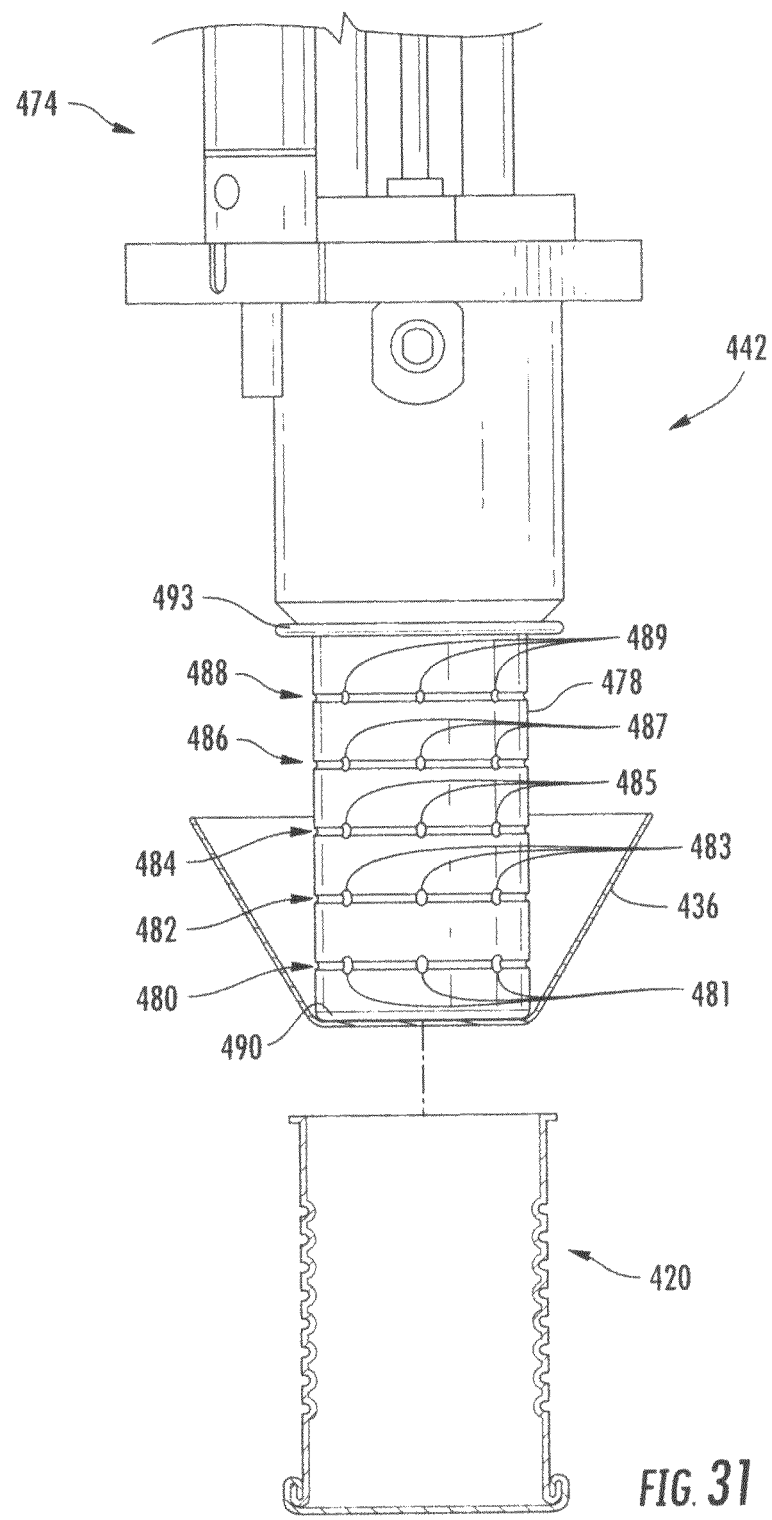
FIGS. 31-40 illustrate an embodiment of a method for applying the lining element to the interior of a container with the arrangement and mechanism of FIG. 30.

With reference to FIG. 31, the liner displacement portion 478 is configured to create a vacuum around itself, e.g., pull air through apertures 481, 483, 485, 487, and 489 to create an area of lower than ambient pressure around the displacement portion 478. As the vacuum is created, the heated liner sheet 436, e.g., heated above its glass transition temperature, is pulled toward the liner displacement portion 478. In one embodiment, the liner displacement portion 478 also includes a bottom central aperture defined in the lower end 490 of the liner displacement portion 478. Additionally, in one embodiment, fluid is drawn through the bottom central aperture defined in the lower end 490 of the liner displacement portion 478, tending to draw the heated liner sheet 436 toward the liner displacement portion 478.

The central portion of the liner sheet 436 contacts the lower end 490 of the liner displacement portion 478. The liner sheet 436 is pulled and stretched with the radial periphery of the liner sheet 436 being displaced upwardly around the liner displacement portion toward the lower portion 476.

Figure 32:
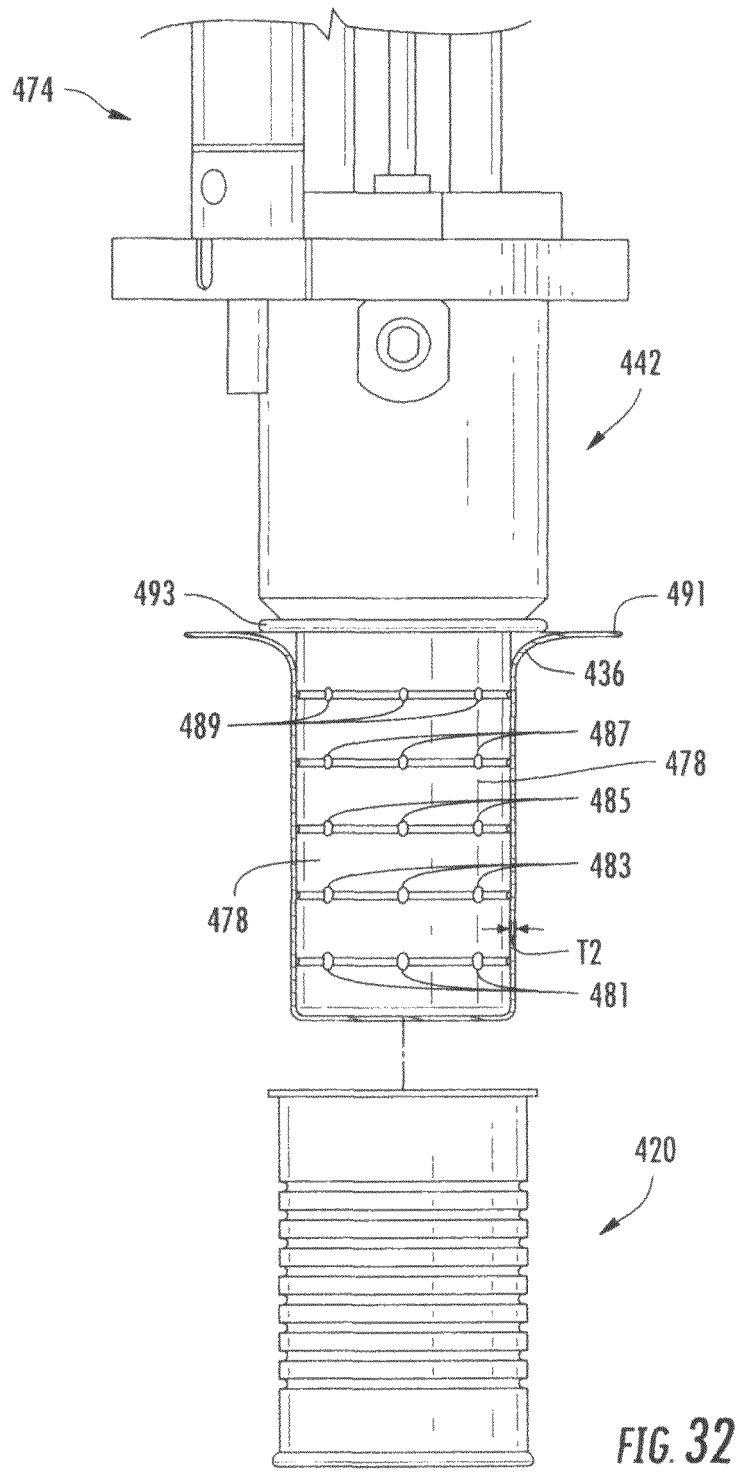

As illustrated in FIG. 32, in one embodiment, the radial outer periphery of the liner sheet 436 continues to be stretched and pulled upwardly and radially inwardly toward the liner displacement portion 478 until it generally surrounds the liner displacement portion 478, with a portion 491 of the liner sheet 436 proximate the radial outer periphery extending radially outwardly from the liner displacement portion 478. In one embodiment, the liner sheet 436, upon being displaced and stretched around the liner displacement portion 478, has a thickness T2. In one embodiment, the thickness T2 is less than the thickness T1 of the liner before being stretched (see FIG. 30).

In one embodiment, the liner sheet 436 comprises a film, such as, for example, a high elongation film, e.g., film configured to be stretched without tearing and remain elongated without wrinkling, etc.

Figure 33:
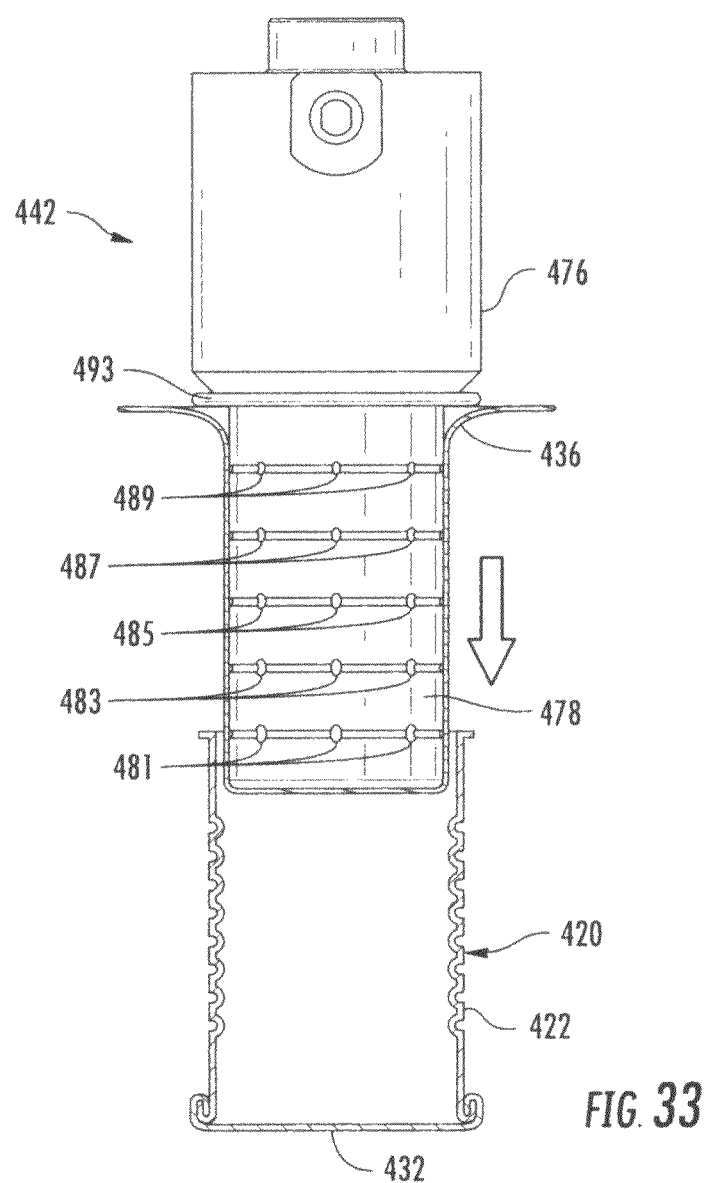

As illustrated in FIG. 33, the upper portion 474 displaces the lower portion 476, including the liner displacement portion 478 and the liner sheet 436, downwardly into the interior of the can 420 toward the can end 432. In one embodiment, the upper portion 474 displaces the lower portion 476, including the liner displacement portion 478 and the liner sheet 436 downwardly into the interior of the can 420 as the vacuum draws the liner sheet 436 to its location surrounding the liner displacement portion 478. In one embodiment, while being displaced downwardly, the liner displacement portion 478 maintains the vacuum pressure around its exterior, maintaining the liner sheet 436 against the liner displacement portion 478.

Figure 34:
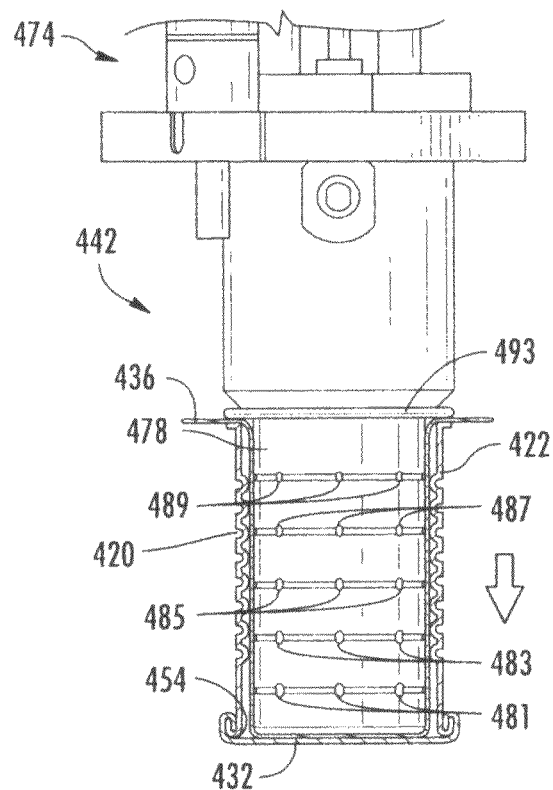

With reference to FIG. 34, in one embodiment, the liner displacement portion 478 and the liner sheet 436 are displaced to the can end 432. As the liner sheet 436 is displaced to the can end 432, air is displaced from between the liner sheet 436 and the can end 432.

In one embodiment, a seal, illustrated in FIG. 34 as a sealing O-ring 493, extends around the liner displacement portion 478. When the liner displacement portion 478 is located in the container proximate the can end 432, the O-ring 493 is configured to seal with the liner sheet 436 to prevent fluid from flowing out from between the liner sheet 436 and the displacement portion 478. In one embodiment, the O-ring 493 is configured to seal with the liner sheet 436 but to allow fluid to flow outwardly from the container from between the liner sheet 436 and the sidewall 422. In one embodiment, the O-ring 493 includes notches such that O-ring 493 seals with the liner sheet 436 but allows fluid flow out from between the liner sheet 436 and the sidewall 422 out of the container. In one embodiment, the O-ring 493 is ventable, allowing fluid to escape from between the liner sheet 436 and the sidewall 422.

Figure 35:
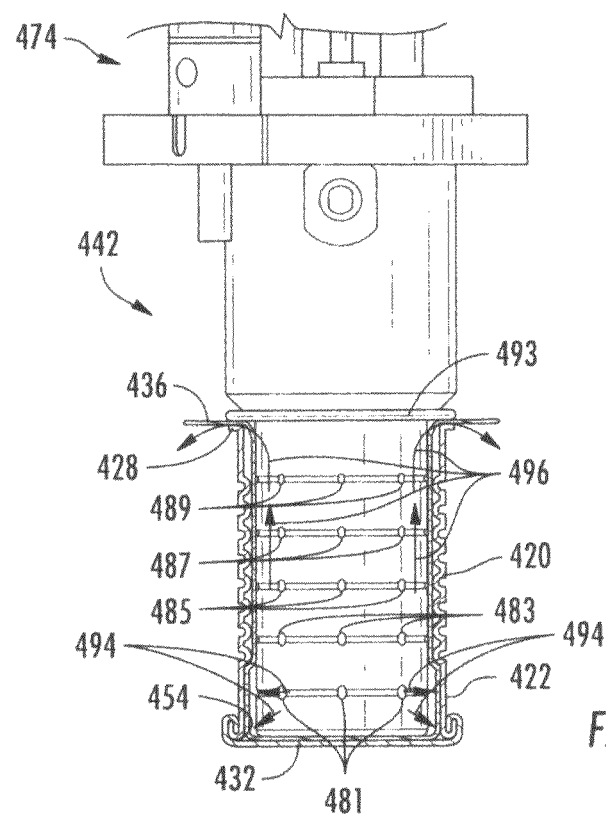

As illustrated in FIG. 35, in one embodiment, with the liner sheet 436 located at the can end 432, the liner displacement portion 478 reverses the flow of air through the bottom central aperture defined in the lower end 490 of the liner displacement portion 478, e.g., stops drawing air from the exterior of the liner displacement portion 478 through the bottom central aperture and begins expelling fluid, e.g., air, from the bottom central aperture. Additionally, in one embodiment, the liner displacement portion 478 reverses the flow of air through the apertures 481, e.g., stops drawing air from the exterior of the liner displacement portion 478 through the apertures 481 and begins expelling fluid, e.g., air, from the apertures 481, forcing the portion of the liner sheet 436 proximate the can end 432 toward the sidewall 422 proximate the can end 432 and forcing air from between the liner sheet 436 and the sidewall 422, including air in the corner 454, out from between the liner sheet 436 and the sidewall 422 toward the first open end 428 of the can 420. In one embodiment, as the liner displacement portion 478 reverses the flow of air through the apertures 481, the liner displacement portion 478 continues creating the vacuum with the other apertures 483, 485, 487, and 489, e.g., maintains suction through the other apertures 483, 485, 487, and 489, maintaining the rest of the liner sheet 436 against the liner displacement portion 478. In FIG. 35, the arrows 494 proximate the can end 432 illustrate air flow direction outwardly from the apertures 481. The arrows 496 illustrate air flow direction from between the liner sheet 436 and the sidewall 422 toward the first open end 428 of the can 420.

Figure 36:
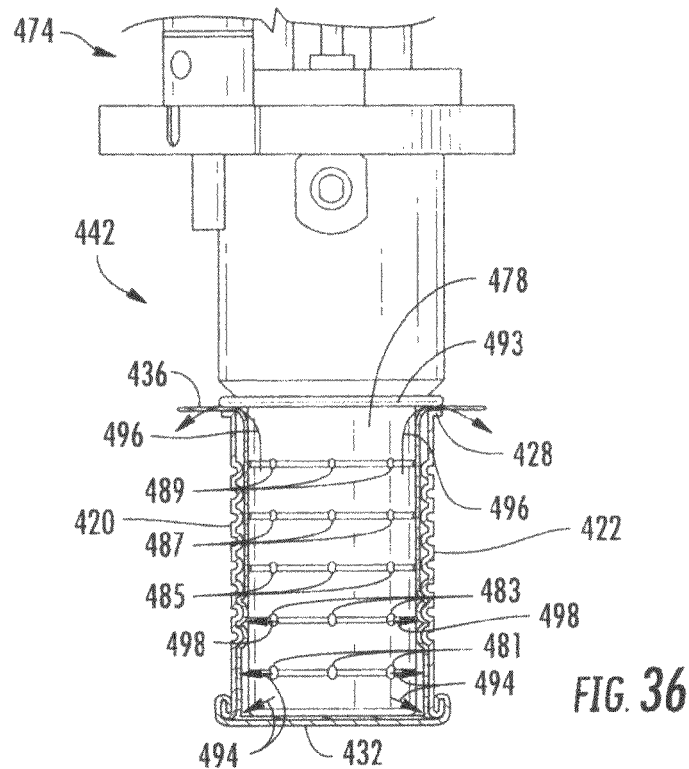

As illustrated in FIG. 36, in one embodiment, the liner displacement portion 478 then reverses the flow of air through the apertures 483 above the apertures 481, e.g., stops drawing air from the exterior of the liner displacement portion 478 through the apertures 483 and begins expelling fluid, e.g., air, from the apertures 483, forcing the portion of the liner sheet 436 proximate the apertures 483 toward the sidewall 422 and forcing air from between the liner sheet 436 and the sidewall 422 out from between the liner sheet 436 and the sidewall 422 toward the first open end 428 of the can 420. In one embodiment, as the liner displacement portion 478 reverses the flow of air through the apertures 483, the liner displacement portion 478 continues creating the vacuum with the other apertures 485, 487, and 489, e.g., maintains suction through the other apertures 485, 487, and 489, maintaining the rest of the upper portion of the liner sheet 436 against the liner displacement portion 478, and continues expelling air through the apertures 481. In FIG. 36, the arrows 498 illustrate air flow direction outwardly from the apertures 483.

Figure 37:
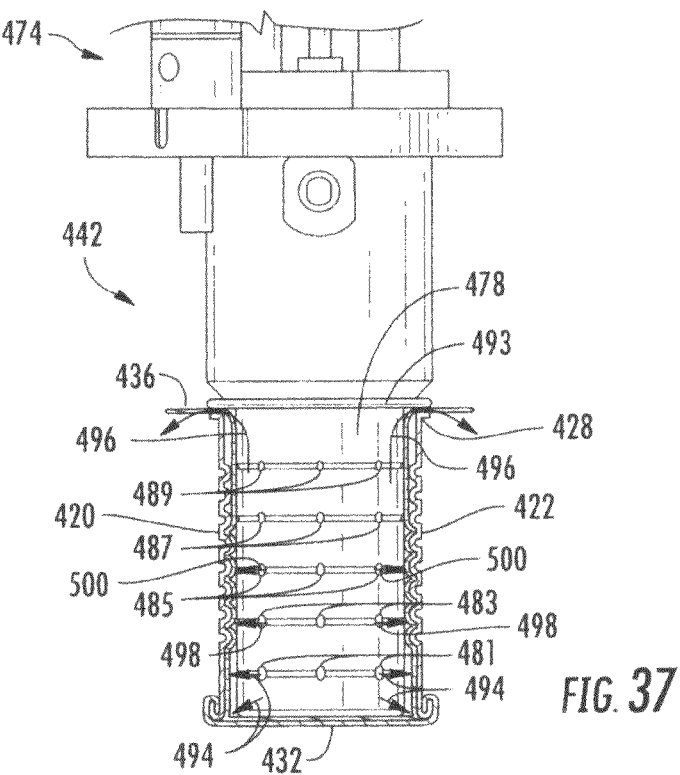

With reference to FIG. 37, in one embodiment, the liner displacement portion 478 then reverses the flow of air through the apertures 485 above the apertures 483, e.g., stops drawing air from the exterior of the liner displacement portion 478 through the apertures 485 and begins expelling fluid, e.g., air, from the apertures 485, forcing the portion of the liner sheet 436 proximate the apertures 485 toward the sidewall 422 and forcing air from between the liner sheet 436 and the sidewall 422 out from between the liner sheet 436 and the sidewall 422 toward the first open end 428 of the can 420. In one embodiment, as the liner displacement portion 478 reverses the flow of air through the apertures 485, the liner displacement portion 478 continues creating the vacuum with the other apertures 487, and 489, e.g., maintains suction through the other apertures 487 and 489, maintaining the rest of the upper portion of the liner sheet 436 against the liner displacement portion 478, and continues expelling air through the apertures 481 and 483. In FIG. 37, the arrows 500 illustrate air flow direction outwardly from the apertures 485.

Figure 38:
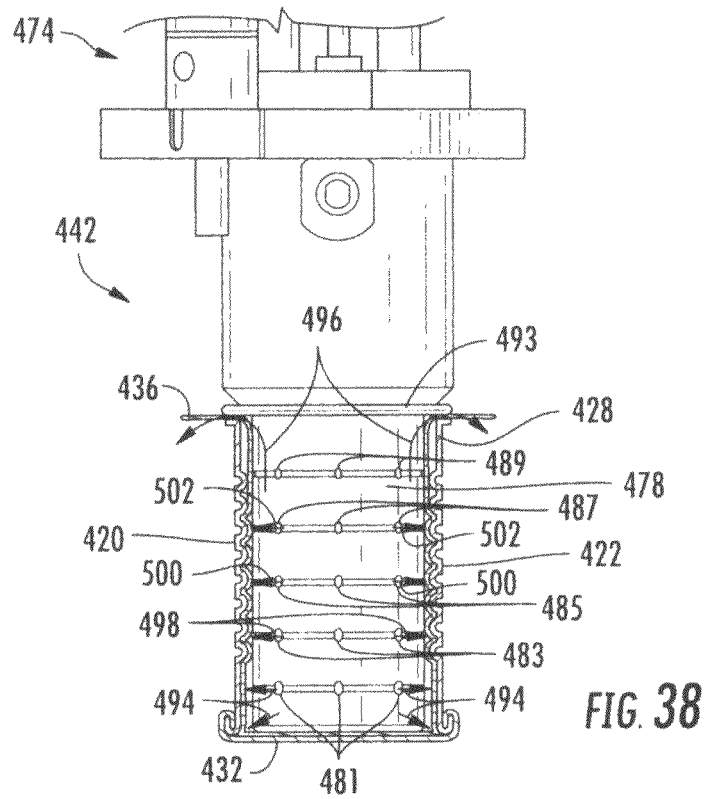

With reference to FIG. 38, in one embodiment, the liner displacement portion 478 then reverses the flow of air through the apertures 487 above the apertures 485, e.g., stops drawing air from the exterior of the liner displacement portion 478 through the apertures 487 and begins expelling fluid, e.g., air, from the apertures 487, forcing the portion of the liner sheet 436 proximate the apertures 487 toward the sidewall 422 and forcing air from between the liner sheet 436 and the sidewall 422 out from between the liner sheet 436 and the sidewall 422 toward the first open end 428 of the can 420. In one embodiment, as the liner displacement portion 478 reverses the flow of air through the apertures 487, the liner displacement portion 478 continues creating the vacuum with the other apertures 489, e.g., maintains suction through the other apertures 489, maintaining the rest of the upper portion of the liner sheet 436 against the liner displacement portion 478, and continues expelling air through the apertures 481, 483, and 485. In FIG. 38, the arrows 502 illustrate air flow direction outwardly from the apertures 487.

Figure 39:
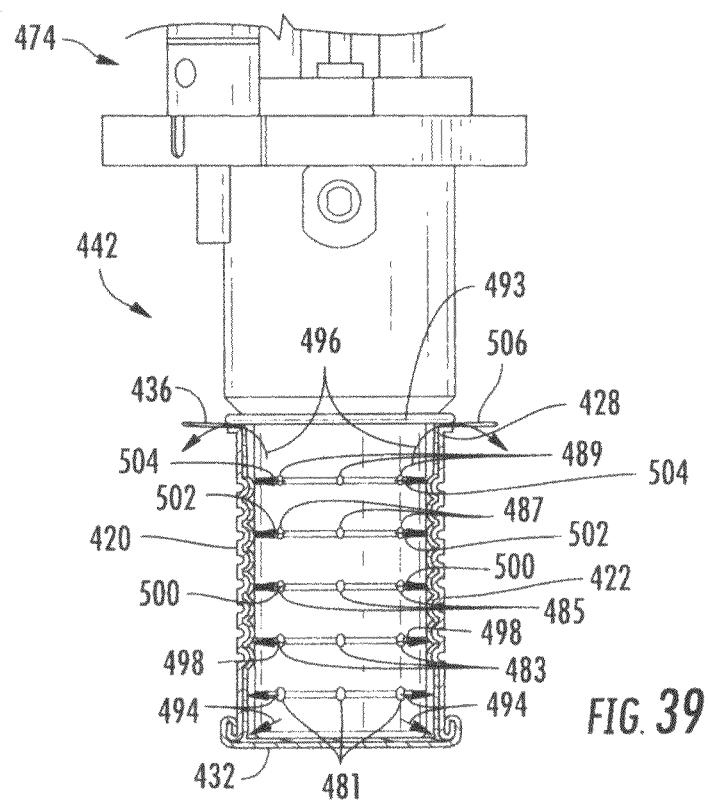

With reference to FIG. 39, in one embodiment, the liner displacement portion 478 then reverses the flow of air through the apertures 489 above the apertures 487, e.g., stops drawing air from the exterior of the liner displacement portion 478 through the apertures 489 and begins expelling fluid, e.g., air, from the apertures 489, forcing the portion of the liner sheet 436 proximate the apertures 489 toward the sidewall 422 and forcing air from between the liner sheet 436 and the sidewall 422 out from between the liner sheet 436 and the sidewall 422 toward the first open end 428 of the can 420 and out of the interior of the can 420. In one embodiment, as the liner displacement portion 478 reverses the flow of air through the apertures 487, the liner displacement portion 478 continues expelling air through the apertures 481, 483, 485, and 487. In FIG. 39, the arrows 504 illustrate air flow direction outwardly from the apertures 489. In one embodiment, an excess portion 506 of the liner sheet 436 outside of the can 420 is removed, e.g., cut away, other suitable removal mechanism, etc.

Figure 40:
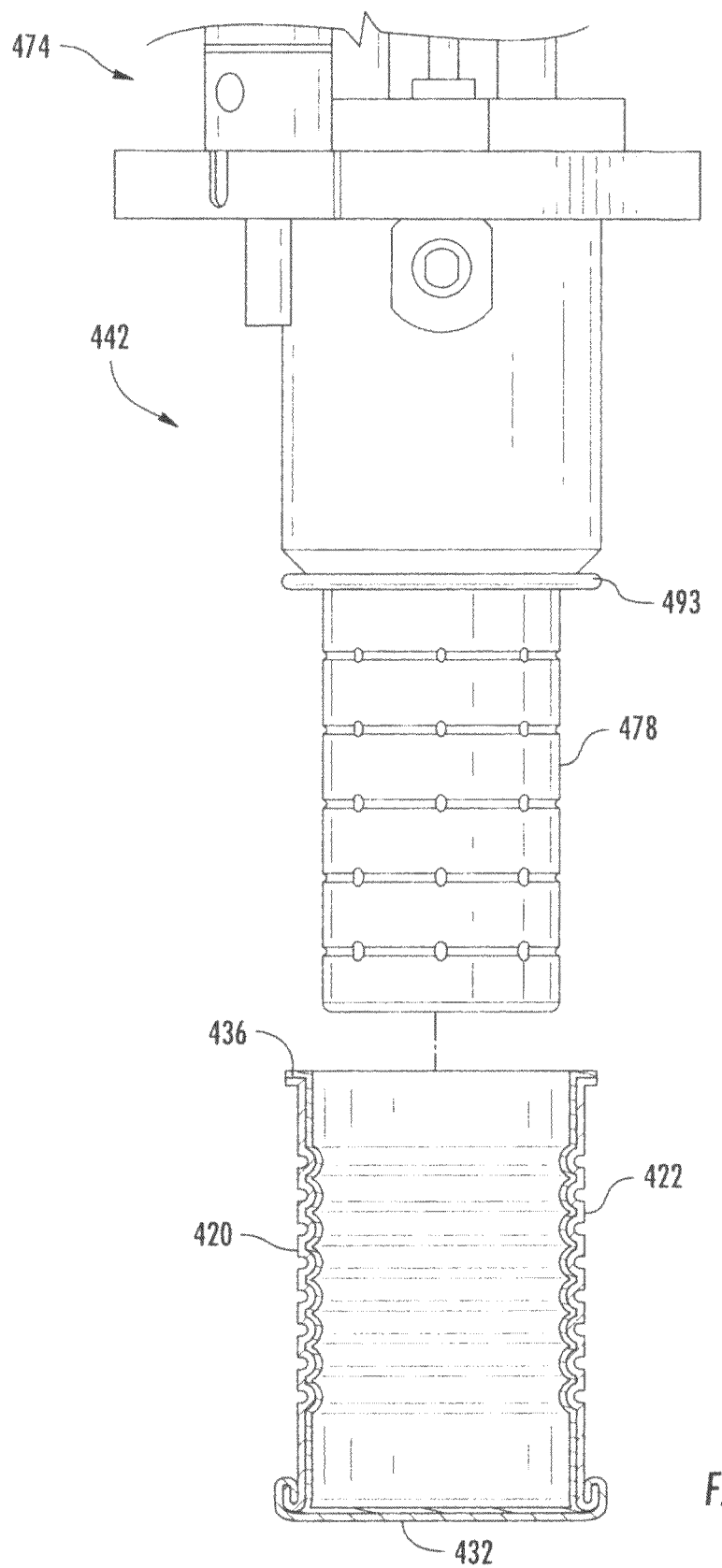

With reference to FIG. 40, the liner sheet 436 is coupled to the interior surface of the sidewall 422 of the can 420. The upper portion 474 displaces the lower portion 476, including the liner displacement portion 478, upwardly out of the can 420, with the liner sheet 436 remaining in the can 420.

In other embodiments, the liner displacement portion 478 reverses the flow of air through apertures in other suitable orders, e.g., reverses air flow through pairs of sets of apertures 481 and 483 simultaneously, etc.

In one embodiment, the apertures 481, 483, 485, 487, and 489 are generally the same size. In other embodiments, the apertures 481, 483, 485, 487, and 489 are other suitable sizes and/or shapes. In one embodiment, larger apertures may allow a greater volume of fluid per unit of time to pass through the apertures and provide more vacuum force toward the liner displacement portion 478 than smaller apertures. Additionally, in one embodiment, larger apertures may allow a greater volume of fluid per unit time to pass through the apertures and provide more force outward away from the displacement portion 478 when air flow is reversed to flow outwardly through the apertures.

Figures 41, 41A:
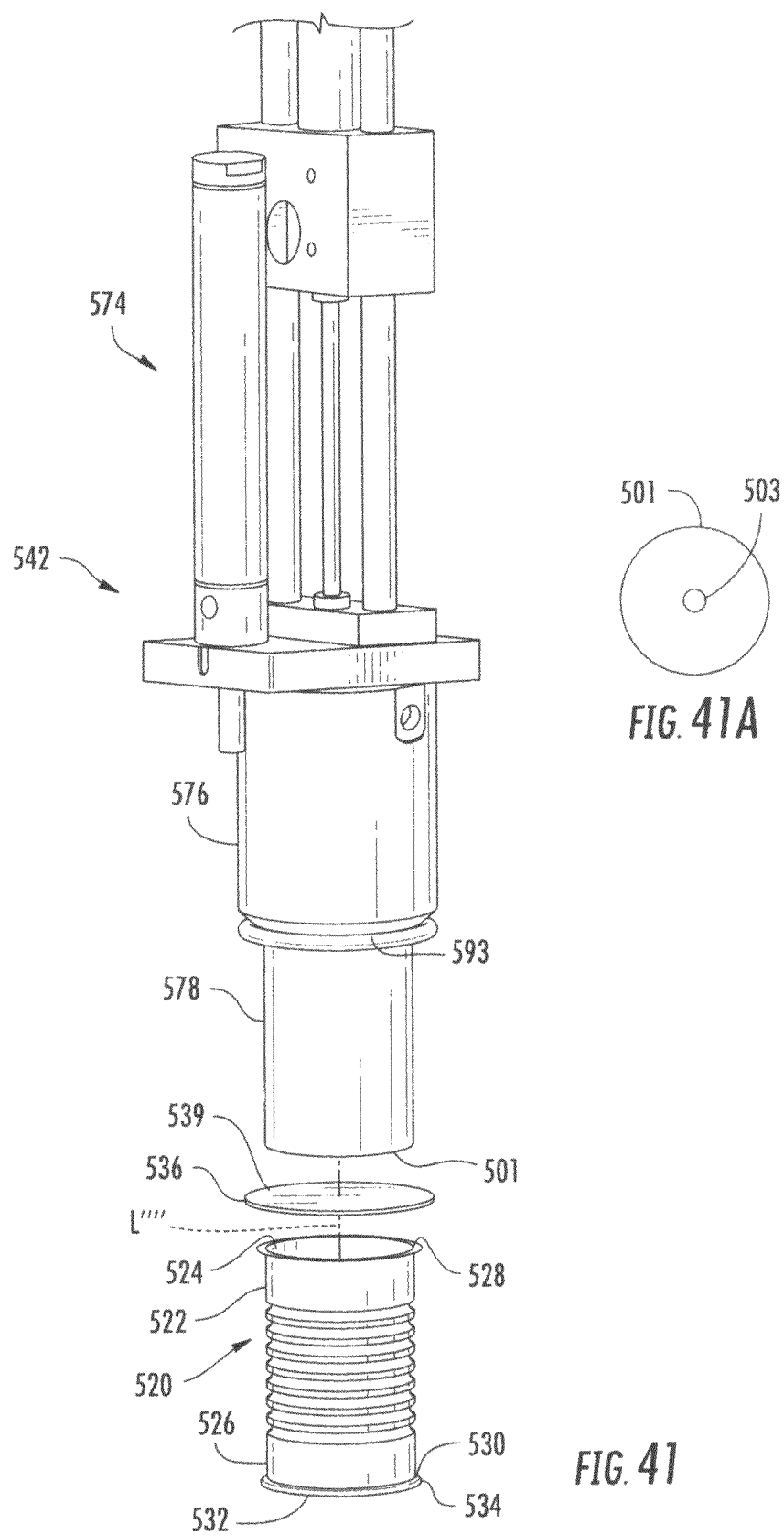
FIG. 41 is an embodiment of an arrangement and mechanism for applying an embodiment of a lining element to the interior of a container located above an embodiment of a container and an embodiment of a lining element.
FIG. 41A is a bottom view illustrating an aperture in a liner displacement mechanism.

With reference to FIG. 41, another embodiment of a container, shown as a can 520 is illustrated. The can 520 includes a generally cylindrical sidewall 522 with an interior surface 524 and an exterior surface 526. The sidewall 522 extends along a longitudinal axis L"" from a first open end 528 to a second end 530. The second end 530 is closed by a can end 532 which is coupled to the second end 430 of the sidewall 522 by a double-seam 534. With further reference to FIG. 41, in one embodiment, a lining element, illustrated in FIG. 41 as a liner sheet 536, is provided proximate the first open end 528 of the can 520. As in the previous embodiment, adhesive may be applied to the liner sheet 536 prior to displacing the liner sheet 536 into the can 520. As described with regard to the embodiment above, the liner sheet 536 and the can 520 may be heated.

A displacement mechanism 542 configured to deform the liner sheet 536 and displace the liner sheet 536 into the can 520 through the first open end 528 is illustrated. The displacement mechanism 542 includes an upper portion 574 and a lower portion 576, e.g., mandrel, etc., coupled to the upper portion 574. The upper portion 574 is configured to displace the lower portion 576 axially upwardly and downwardly toward and away from the can end 532 of the can 520.

The lower portion 576 of the displacement mechanism 542 includes a liner displacement portion 578 configured to displace the liner sheet 536 into the can 520. The liner displacement portion 578 is sized to be received into the interior of the can 520. For example, in the illustrated embodiment, the cylindrical can 520 is generally circular in radial cross-section. The liner displacement portion 478 is also generally circular in radial cross-section with a diameter smaller than the diameter of the can 520 to allow the liner displacement portion 578 and the liner sheet 536 to pass through the first open end 528 and into the interior of the can 520 toward the can end 532.

In the illustrated embodiment, the lower surface 501 of the liner displacement portion 578 includes an aperture 503 (see FIG. 41A) through which the liner displacement portion 578 is configured to expel fluid.

Figure 42:
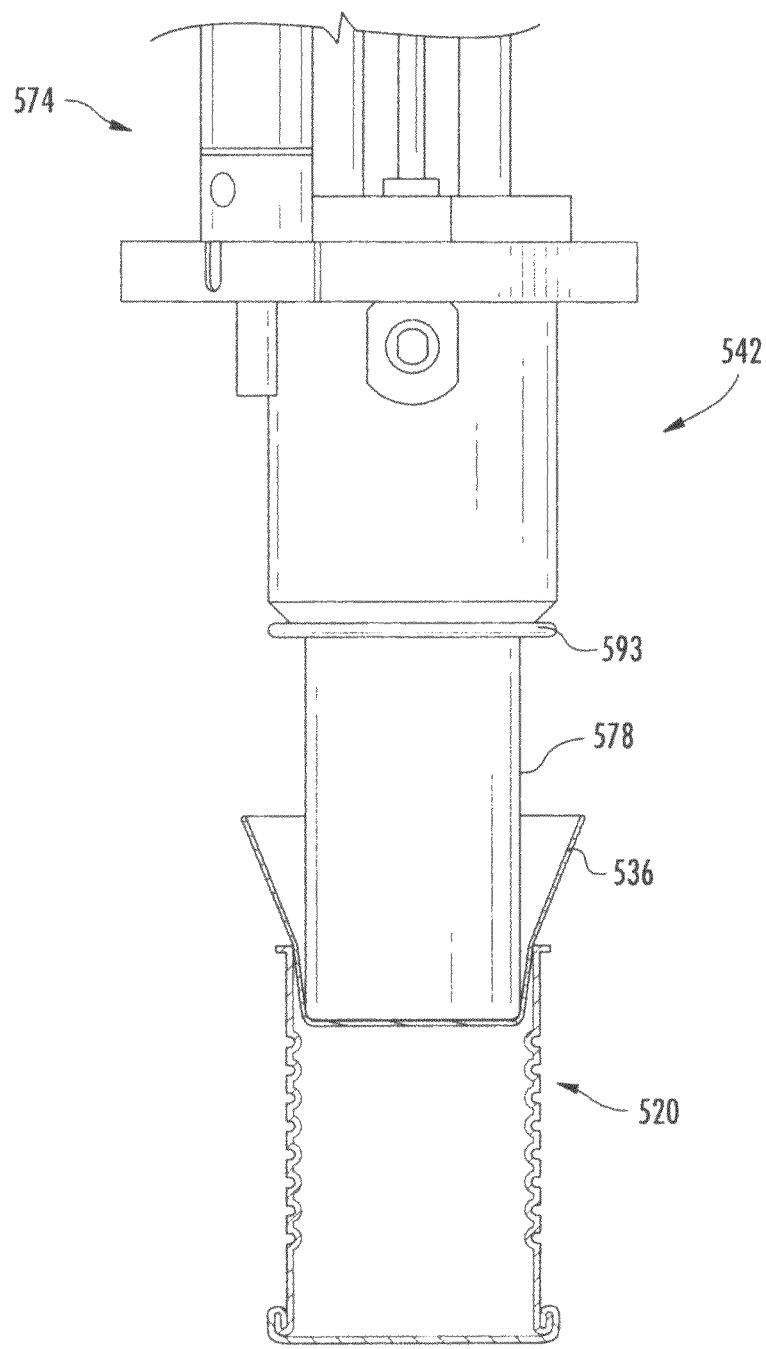
FIGS. 42-43 illustrate an embodiment of a method for applying the lining element to the interior of a container with the arrangement and mechanism of FIG. 41.

With reference to FIG. 42, the liner sheet 536 is held in place proximate its radial periphery. The liner displacement portion 578 is moved into the liner sheet 536 and stretches the liner sheet 536 into the can 520.

Figure 43:
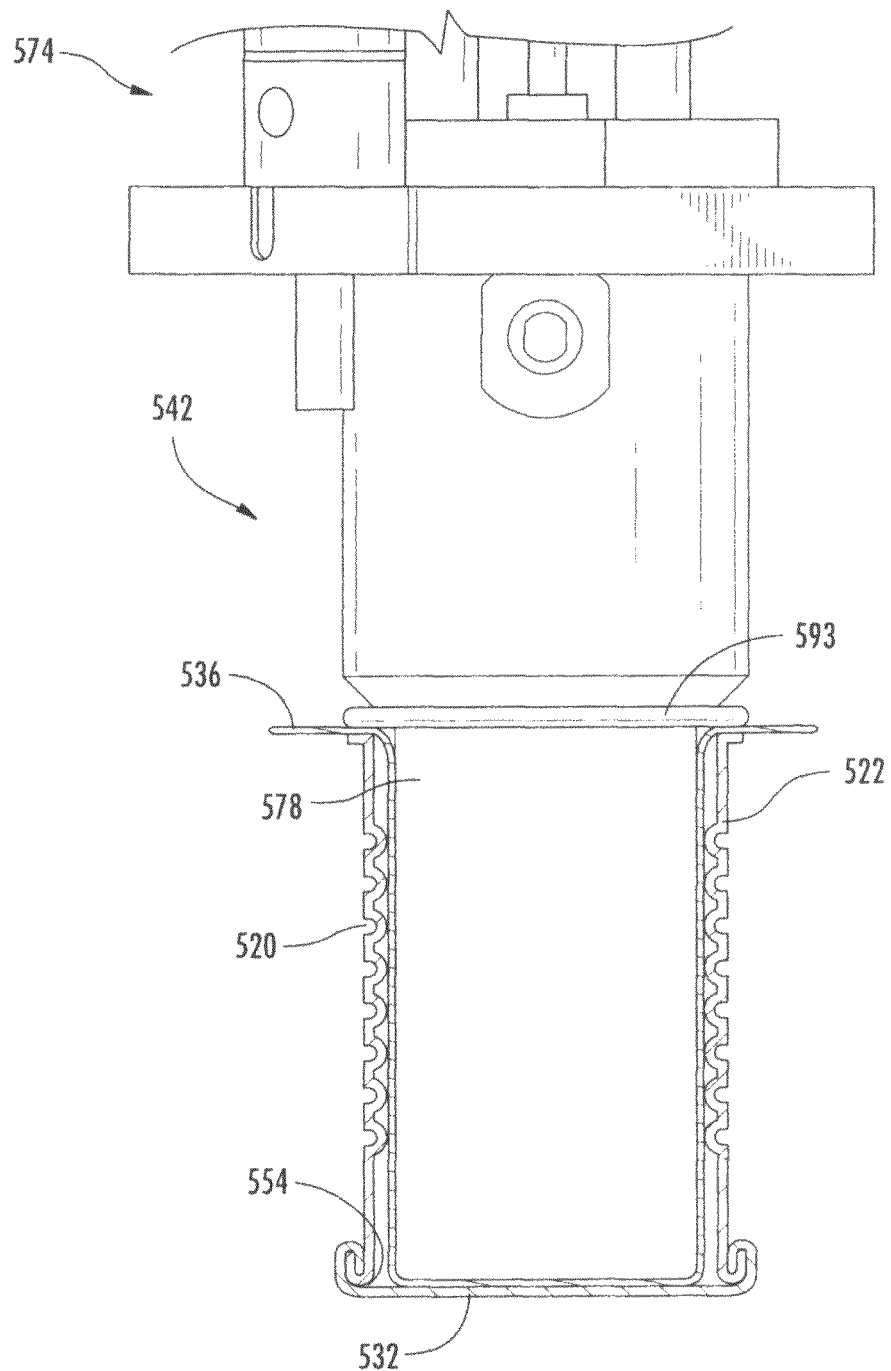

With reference to FIG. 43, with the liner sheet 536 located proximate the can end 532, the seal, illustrated as O-ring seal 593, seals with the liner sheet 536 such that fluid is prevented from escaping from between the liner sheet 536 and the liner displacement portion 578, but fluid is allowed to escape from between the liner sheet 536 and the sidewall 522 out of the can 520. In one embodiment, the seal is ventable, allowing fluid to exit from between the liner sheet 536 and the sidewall 522.

Fluid is expelled from the aperture 503 (not illustrated in FIG. 43), displacing the liner sheet 536 toward the sidewall 522 and displacing air from between the liner sheet 536 and the sidewall 522 out of the can 520.

In one embodiment, when air is expelled from the aperture 503, the liner displacement portion 578 and the seal 593 may be displaced upwardly away from the can end 532 for a short period of time, allowing air to escape from between the liner sheet 536 and the sidewall 522 out of the can 520. The displacement portion 578 and the seal 593 may then be displaced back downwardly into the initial configuration with the liner displacement portion 578 located proximate the can end 532.

Figure 45:
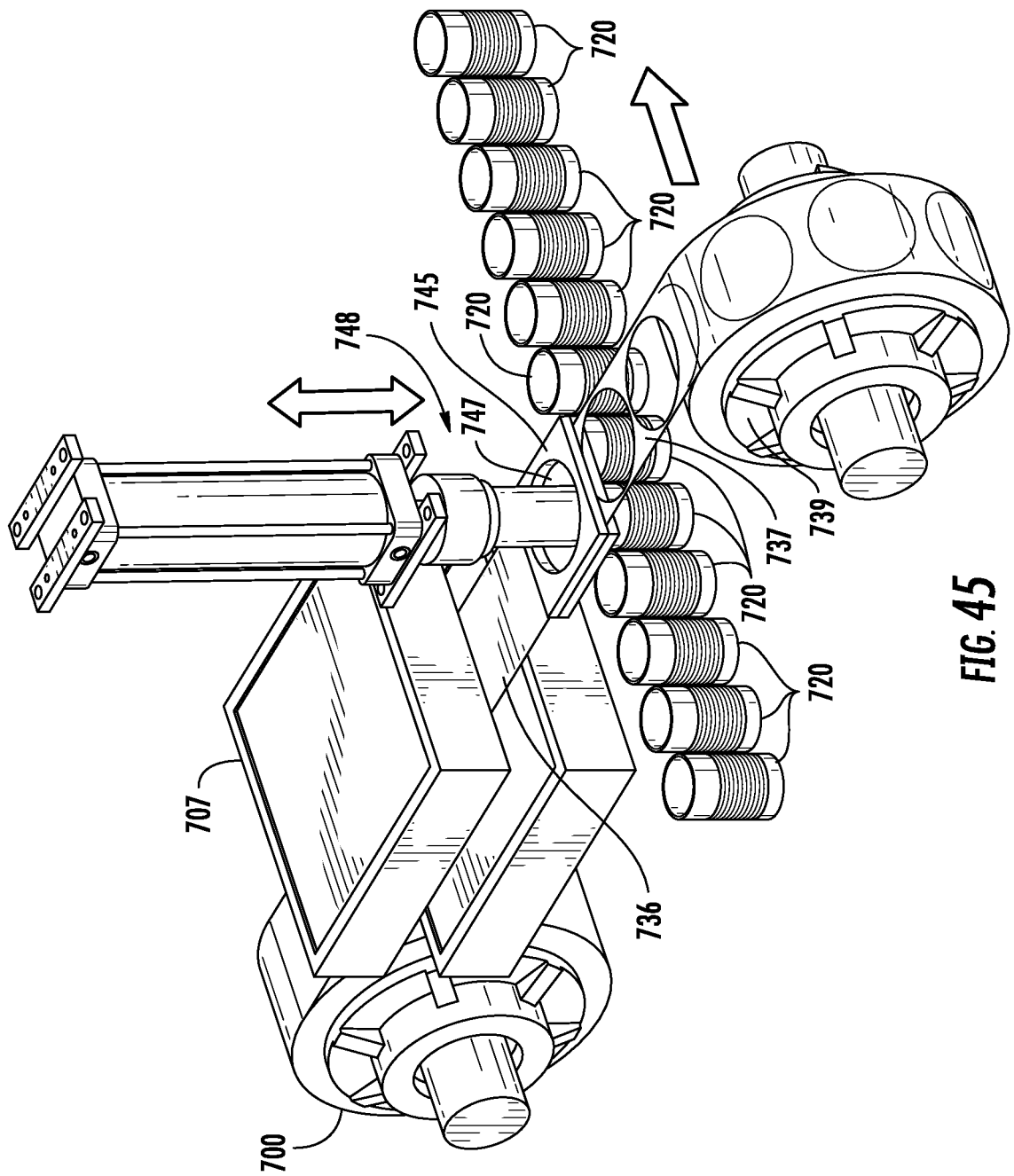
FIG. 45 illustrates an embodiment of a system for lining cans.
Figure 46:
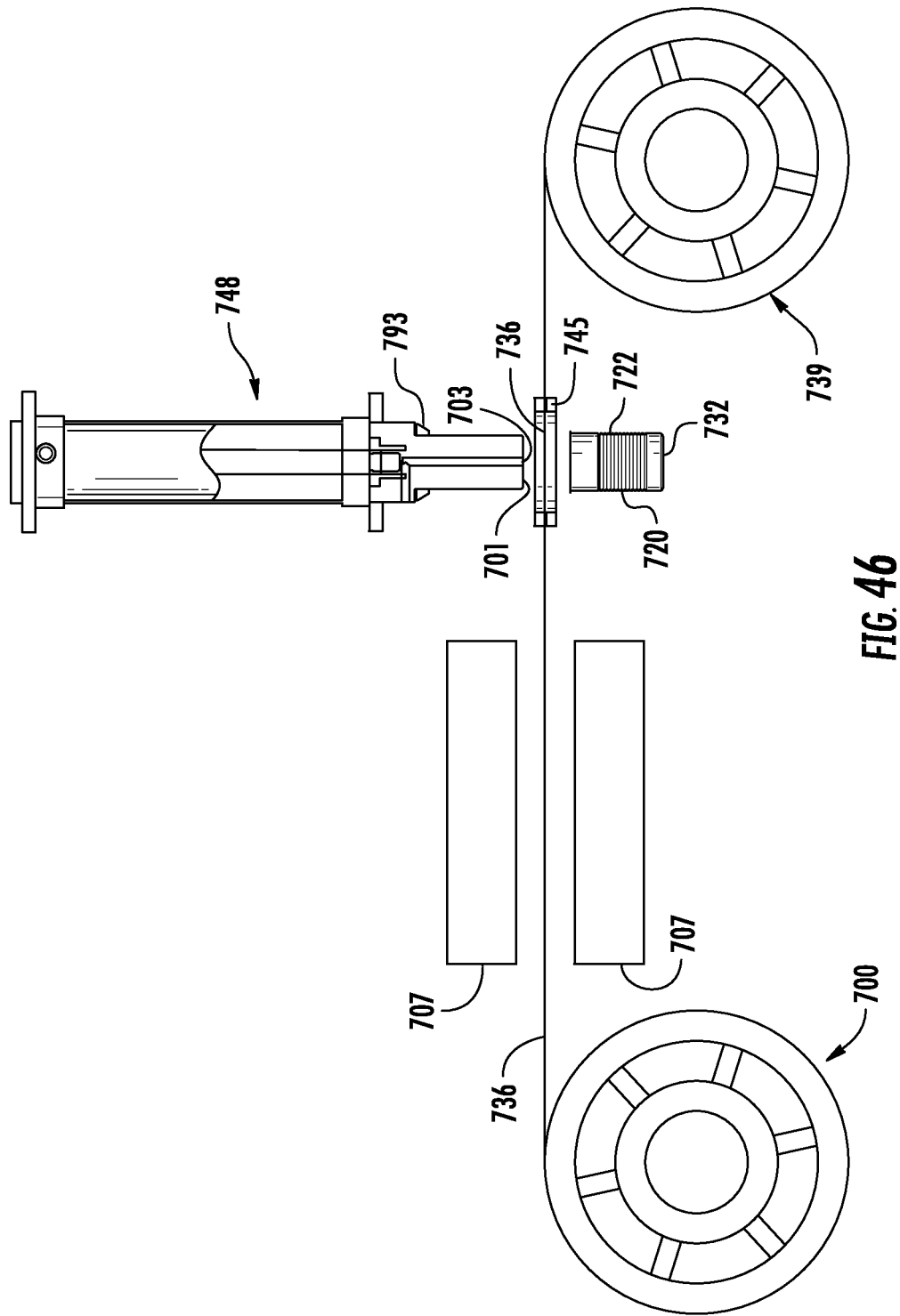
FIG. 46 is a side view of the system of FIG. 45.
Figure 47:
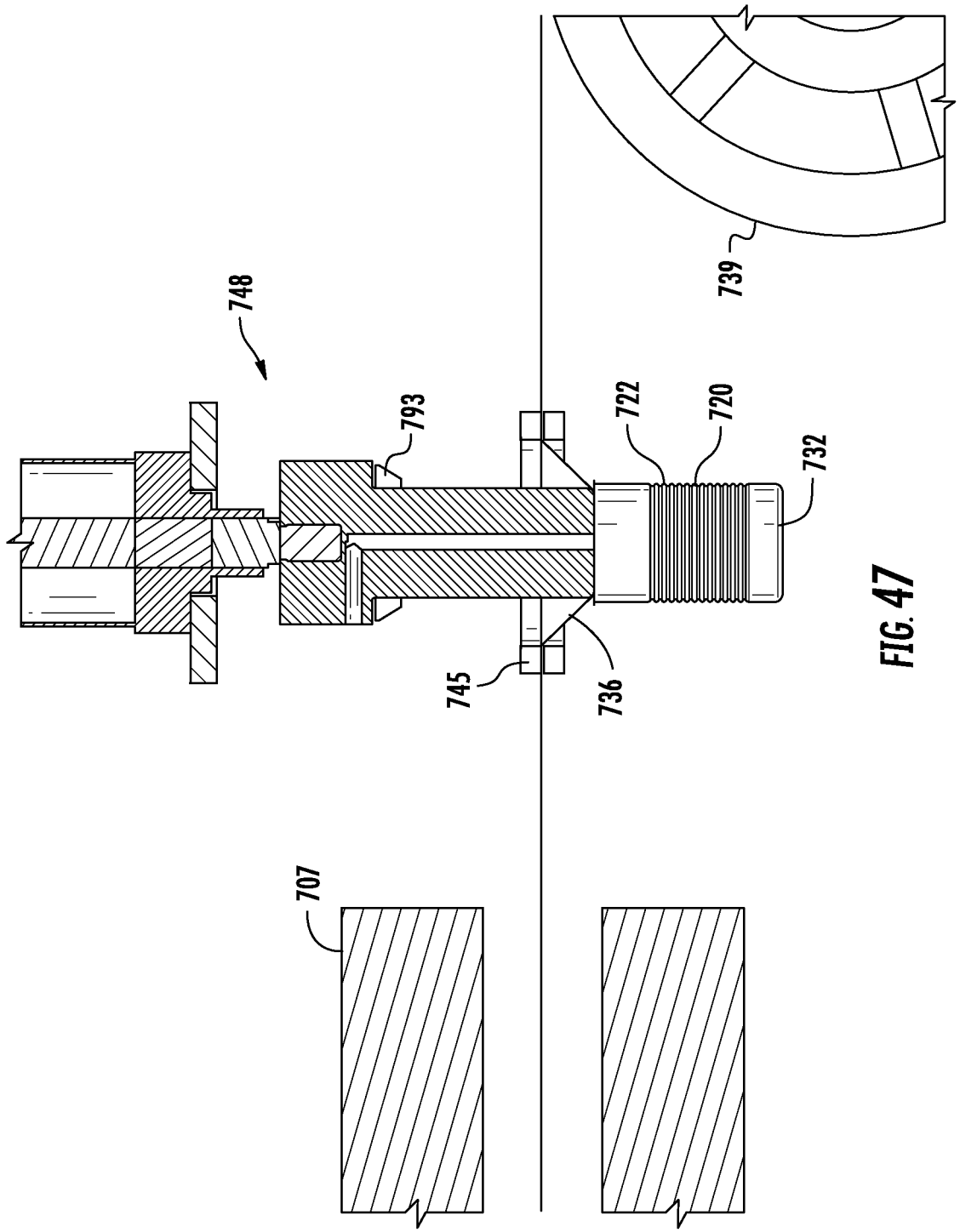
FIG. 47 illustrates a portion of the system of FIG. 46 with the liner displacement portion displacing the lining element into a can.
Figure 48:
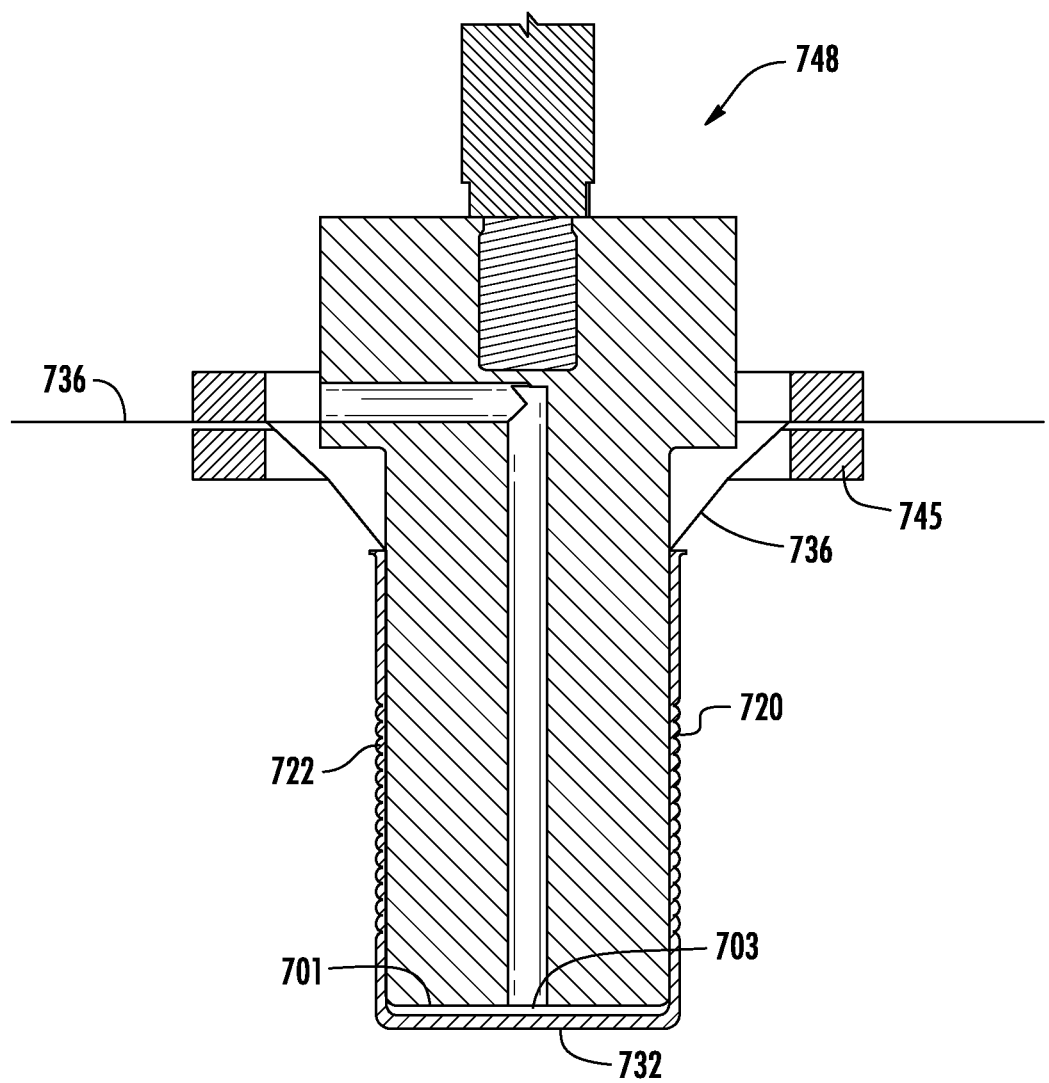
FIG. 48 is a cross-sectional view of the can of FIG. 47 with the liner displacement mechanism forcing the lining element toward the sidewall of the can.

With reference to FIG. 45, an embodiment of a system for lining cans 720 is illustrated. A roll 700 dispenses liner sheet material 736 to a heater, illustrated as an infrared heater 707, where the liner material 736 is heated. The heated liner material 736 passes from the heater to a liner sheet holding mechanism 745.

With reference to FIGS. 45-48, the mechanism 745 is configured to hold and support the liner sheet material 736. The mechanism 745 has an open central portion 747. The mechanism 745 is configured to hold a portion of the liner material 736 above a can 720. A liner displacement mechanism 748 is configured to move from a first location outside of the 720 and above the mechanism 745 through the open central portion 747 into contact with the liner material 736 and to stretch the liner material 736 into the can 720. Inside the can 720, the liner displacement portion 748 expels fluid, e.g., from the aperture 703 in the bottom surface 701 (see FIG. 48), forcing the liner material 736 against the end wall 732 and sidewall 722, forcing air between the liner material 736 and the sidewall 722 to exit the can 720. Excess liner material 736 is then removed, e.g., by a cutting die, etc. The remaining liner material 737 is moved to a take-up core 739. The liner material 737 may be recycled.

The cans 720 may be moved into position under the liner displacement mechanism 748, e.g., by a conveyor. The cans 720, upon being lined with liner material 737, may be moved away from the liner displacement mechanism 748.

In one embodiment, the lining elements described above are stretched and thinned as they are displaced toward the can ends by the liner displacement mechanisms.

In one embodiment, the outer surface of the liner displacement portion includes a coating, e.g., Teflon® coating available from DuPont™, silicone coating, etc., configured such that the liner sheet will stretch over the liner displacement portion without sticking to the outer surface and will release from the outer surface of the liner displacement portion when air is discharged from the apertures. In another embodiment, the outer surface of the liner displacement portion is formed from suitable metal such that the liner sheet will release from the outer surface of the liner displacement portion when air is discharged from the apertures. In other embodiments, other suitable constructions of liner displacement portions may be used.

In one embodiment, the fluid expelled from apertures of the liner displacement portions described above may be heated fluid.

Figure 44:
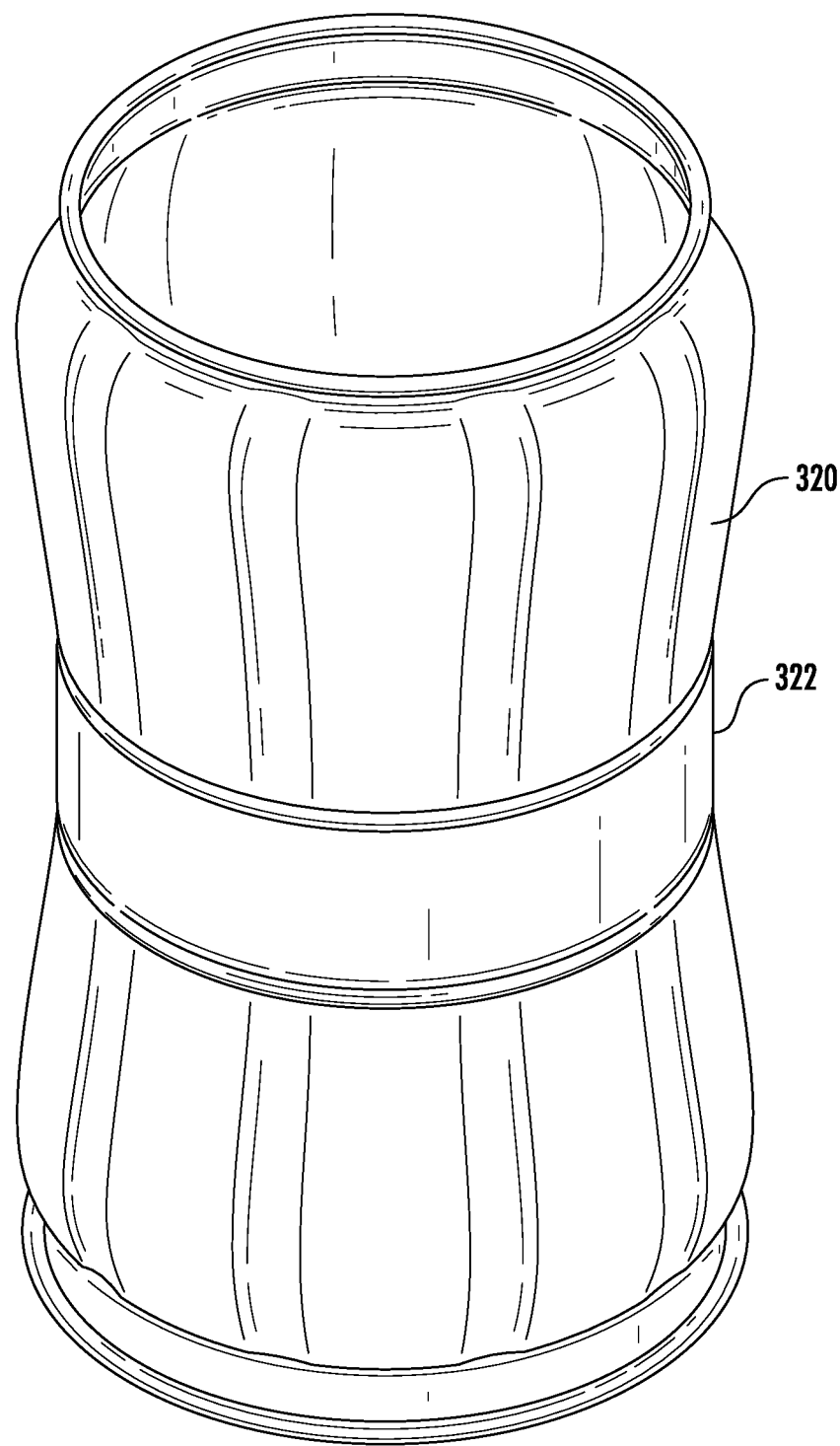
FIG. 44 is a perspective view of an embodiment of a shaped container within which a lining element can be inserted.

Containers discussed herein, and to the interiors of which lining elements may be applied by the embodiments of methods described above, may include containers of a wide variety of styles, shapes, sizes, etc. For example, the containers discussed herein may be shaped such that cross-sections taken perpendicular to the longitudinal axis of the container are generally circular. However, with reference to FIG. 44, in other embodiments the sidewall of the containers, such as can 320, may be shaped in a variety of ways (e.g., having other non-polygonal cross-sections, as a rectangular prism, a polygonal prism, any number of irregular shapes, etc.) as may be desirable for different applications and embodiments of mechanisms and methods described herein may be used to apply lining elements to containers having other non-polygonal cross-sections, as a rectangular prism, a polygonal prism, any number of irregular shapes, etc. In various embodiments, the sidewall 322 of the can 320 may include one or more axially extending sidewall sections that are curved or angled radially inwardly or outwardly such that the diameter of the can is different at different locations along the axial length of the can, and such curved or angled sections may be smooth continuous curved sections. The cans may be of various sizes (e.g., 3 oz., 8 oz., 12 oz., 15 oz., 28 oz, etc.) as desired for a particular application. A lining element may be adhered to the interior surface of the can 320 by embodiments of any of the mechanisms and/or any of the methods described above. Additionally, in other embodiments, the cans may be two-piece cans.

In some embodiments, of lining elements, such as liner sheets, described have a layer configured to contact the interior of cans to be lined. In one embodiment, this layer is a layer configured to couple the liner sheet to the cans, e.g., a tie layer. In one embodiment, the tie layer is generally non-tacky at, e.g., room temperature. In one embodiment, when the liner sheet is heated, the tie layer is activated, e.g., the tie layer transitions into a state for application of the liner sheet to the can wall such that the tie layer will then couple the liner sheet to the can wall and maintain the liner sheet coupled to the can wall upon cooling of the tie layer. In one embodiment, the tie layer is activated at approximately 275° F.

Lining elements described above may be formed from various plastic materials. In one embodiment, lining elements are formed from thermoplastics. In another embodiment, lining elements are polyethylene terephthalate. In another embodiment, lining elements are polypropylene.

In one embodiment, adhesive is provided on one side of lining elements such as lining sheets. The adhesive is configured to couple, e.g., bond, etc., the lining elements to the interior surfaces of the cans. In one embodiment, the adhesive is a heat-activated adhesive. In another embodiment, the adhesive is pressure-activated adhesive. In another embodiment, the adhesive is requires both heat and pressure to activate.

In some embodiments, when cans and liner sheets are heated prior to coupling the liner sheet to the can, as the can cools, any air that may remain between the liner sheet and the sidewall and/or between the liner sheet and the can end will reduce in volume as the temperature cools, thus creating a vacuum tending to urge the liner sheet toward the sidewall and the can end. In one embodiment, this vacuum will remain and will continue to urge the liner sheet toward the sidewall and can end as long as the temperature of the air remains below the temperature to which it was heated when the liner sheet was applied to the can. In one embodiment, the vacuum will continue to urge the liner sheet toward the sidewall and can end when the can is at ambient temperature and conditions, e.g., later when the can is being transported to, for example, retail stores, displayed, stored, etc.

In one embodiment, liner displacement portions are heated prior to contacting lining elements such as liner sheets.

Embodiments of liner sheets are described above as being coupled to cans with beaded sidewalls. In other embodiments, lining elements such as liner sheets are applied to cans with unbeaded sidewalls. In one embodiment, upon coupling a liner sheet to a can with an unbeaded sidewall, the sidewall of the can is then beaded.

Further, the container ends or can ends discussed herein may be a variety of suitable walls or closures (e.g., a closure, lid, cap, cover, top, end, can end, sanitary end, "pop-top", "pull top", convenience end, convenience lid, pull-off end, easy open end, "EZO" end, etc.). In one embodiment, a can end such as, e.g., an "EZO" convenience end, sold under the trademark "Quick Top" by Silgan Containers Corp, may be coupled to a sidewall to close the top open end of an embodiment of a container upon filing of the container.

Embodiments of the can ends discussed above are shown and/or described coupled to the sidewall via a "double-seam" formed from the interlocked portions of material of the can sidewall and the can end. However, in other embodiments, the can ends discussed herein may be coupled to the sidewall via other mechanisms. For example, can ends may be coupled to the sidewall via welds or solders. The container end may be made of metals, such as steel or aluminum, metal foil, plastics, composites, or combinations of these materials. In various embodiments, the can ends, double-seams, and sidewall of the container are adapted to maintain a hermetic seal after the container is filled and sealed.

As discussed above, the containers discussed herein are configured to hold various items. It should be understood that the can and lining elements discussed herein may be utilized in cans configured to hold edible items. For example, the containers and inserts discussed above may hold nuts, beverages, fruits, meats, vegetables, or any other suitable food, drink, pet food, fluid, milk-based product, etc. It should be understood that the phrase "food" used to describe various embodiments of this disclosure may refer to dry food, moist food, powder, liquid, or any other drinkable or edible material, regardless of nutritional value.

In various embodiments, the cans discussed herein are configured to contain foods at a negative internal pressure (e.g., cans that have an internal vacuum) and the negative internal pressure results in an inwardly directed force on the sidewall of the can. In various embodiments, the negative internal pressure results from hermetically sealing the can (e.g., via doubled-seamed can ends that are coupled to the top and bottom of the sidewall) while the contents of the can are hot and from the subsequently cooling of the can contents within the hermetically sealed can. In various embodiments, the cans discussed herein are configured to hold contents at an internal vacuum of at least 28 pounds/square inch (gauge) or "psig," and in another embodiment, the cans discussed herein are configured to hold contents at an internal vacuum of at least 22 psig. In other embodiments, the cans discussed herein are filled with food located with the internal cavity of the can and the can is sealed and has an internal vacuum of at least 22 psig, in one embodiment, and at least 28 psig, in another embodiment.

In one embodiment, cans described above are formed from metal, e.g., steel, aluminum, alloys, etc., by any suitable mechanism.

In one embodiment, the lining element is generally provided in the shape of a sheet. In another embodiment, the lining element is provided as a bag. In another embodiment, the interior surface of the can end is coated and a lining element is provided as a generally tube-shaped liner and adhered to the interior surface of the sidewall.

In one embodiment, embodiments of lining elements disclosed above may be formed from a suitable film, such as a Bisphenol A-free (BPA-free) film. The film may be located above cans by a suitable film mechanism. In one embodiment, embodiments of lining elements are a thermoplastic. In another embodiment, embodiments of lining elements are a suitable polyolefin. In another embodiment, embodiments of lining elements include an adhesive on one side. In one embodiment, the adhesive is BPA-free. In another embodiment, the adhesive is thermally activated. In another embodiment, the adhesive is pressure activated.

In one embodiment, sidewalls of cans include beading (e.g., for strength, etc.) or other structures that result in different diameters of the sidewall along the longitudinal axis of the sidewalls. In one embodiment, embodiments of applying a lining element to the interior of cans are configured to apply the lining to all or substantially all of the interior surface of the sidewall of cans including structures such as, e.g., beading, sidewalls of varying diameter along their longitudinal axes, etc.

Generally, the arrows in the figures illustrate air flow within and out of embodiments of cans in various embodiments of providing a can with a lining. In other embodiments, air may flow in other directions within and out of embodiments of cans in various embodiments of providing a can with a lining.

In one embodiment, bladders may be formed from flexible material. In one embodiment, bladders may be formed of, e.g., natural or synthetic rubber, plastic, polyolefins, or any suitable flexible and/or expandable material.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

What is claimed is:

1. A method of providing a container comprising:
providing a metal cylindrical sidewall and a metal can end double-seamed to the sidewall, the sidewall having an interior surface and an exterior surface and extending from a first open end to a second end closed by the can end, the can end having an interior surface, the sidewall and the can end defining an interior of the container;
providing a liner sheet proximate the first end of the sidewall, the liner sheet having a first surface and a second surface opposite the first surface;
displacing the liner sheet toward the can end into the interior of the container;
displacing air from between the can end and the liner sheet; and
displacing air from between the sidewall and the liner sheet outside of the container and applying the first surface of the liner sheet to the interior surface of the sidewall.

2. The method of claim 1, wherein the liner sheet does not include BPA.

3. A method of providing a container comprising:
providing a metal cylindrical sidewall and a metal can end double-seamed to the sidewall, the sidewall having an interior surface and an exterior surface and extending from a first open end to a second end closed by the can end, the can end having an interior surface, the sidewall and the can end defining an interior of the container;
providing a liner sheet proximate the first end of the sidewall, the liner sheet having a first surface and a second surface opposite the first surface;
heating the container;
applying adhesive to one of the first surface of the liner sheet and the sidewall of the container;
displacing the liner sheet toward the can end into the interior of the container;
displacing air from between the can end and the liner sheet;
displacing air from between the sidewall and the liner sheet outside of the container and applying the first surface of the liner sheet to the interior surface of the sidewall; and
applying the liner sheet to the sidewall and can end such that the liner sheet covers the interior surface of the can end and the interior surface of the sidewall.

4. A method of providing a container comprising:
providing a metal cylindrical sidewall and a metal can end double-seamed to the sidewall, the sidewall having an interior surface and an exterior surface and extending from a first open end to a second end closed by the can end, the can end having an interior surface, the sidewall and the can end defining an interior of the container;

providing a liner sheet proximate the first end of the sidewall, the liner sheet having a first surface and a second surface opposite the first surface;

displacing the liner sheet toward the can end into the interior of the container;

displacing air from between the can end and the liner sheet; and displacing air from between the sidewall and the liner sheet outside of the container and applying the first surface of the liner sheet to the interior surface of the sidewall;

wherein the step of displacing air between the can end and the liner and between the sidewall and the liner outside of the container and applying the first surface of the liner sheet to the can end and the sidewall includes providing a bladder;

displacing the bladder into the interior of the container;

inflating the bladder;

deflating the bladder; and and removing the bladder from the interior of the container.

5. A method of providing a container comprising:

providing a metal container including a sidewall having an interior surface, the sidewall extending from a first open end to a second end and an can end having an interior surface, the can end coupled to the sidewall closing the second end of the sidewall, the sidewall and the can end forming an open-topped enclosure;

providing a BPA-free film;

displacing the BPA-free film from the first open end of the sidewall to the can end in the interior of the open-topped enclosure;

removing air between the BPA-free film and the sidewall; and adhering the BPA-free film to interior surfaces of the sidewall and the can end such that the film is substantially continuously applied to the interior surfaces of enclosure, the sidewall and the can end.

6. A method of providing a container comprising:

providing a metal container including a sidewall having an interior surface, the sidewall extending from a first open end to a second end and a can end having an interior surface, the can end coupled to the sidewall closing the second end of the sidewall, the sidewall and the can end forming an open-topped enclosure;

providing a BPA-free film;

heating the metal container; and adhering the BPA-free film to interior surfaces of the sidewall and the can end such that the film is substantially continuously applied to the interior surfaces of the sidewall and the can end.

7. The method of claim 6, further comprising providing adhesive on the interior surface of the sidewall and the interior surface of the can end.

8. The method of claim 6, further comprising providing adhesive on the BPA-free film.

9. The method of claim 6, further comprising providing a bladder;

displacing the bladder and the BPA-free film into the open-topped enclosure; and inflating the bladder thereby displacing the BPA-free film toward the sidewall.

10. The method of claim 9, further comprising deflating the bladder; and removing the bladder from the interior of the open-topped enclosure.

11. The method of claim 6, wherein the sidewall has a non-uniform diameter along a vertical axis of the sidewall.

12. The method of claim 6, further comprising removing a portion of the BPA-free film extending beyond the sidewall proximate the first open end.

13. The method of claim 6, further comprising adhering the BPA-free film prior to heating the container; and after adhering the BPA-free film to the sidewall and can end, allowing the container to cool.

14. A method of providing a container comprising:

providing a metal container including a sidewall having an interior surface, the sidewall extending from a first open end to a second end and a can end having an interior surface, the can end coupled to the sidewall closing the second end of the sidewall, the sidewall and the can end forming an open-topped enclosure;

providing a BPA-free film;

providing a displaceable member;

displacing the member into the interior of the container;

withdrawing the member from a first location proximate the can end to a second location proximate the first open end of the sidewall and thereby removing air from between the BPA-free film and the side wall; and adhering the BPA-free film to interior surfaces of the sidewall and the can end such that the film is substantially continuously applied to the interior surfaces of the sidewall and the can end.

15. An apparatus for applying a lining into a metal container, the metal container including a sidewall double-seamed to a can end, the container having a first open end and a second closed end, the apparatus comprising:

a film mechanism configured to provide a film having a first side and a second side opposite the first side; and a film displacement mechanism on the opposite side of the film as the metal container, the film displacement mechanism displaceable from a location outside the metal container through the first open end to a location inside the metal container proximate the can end thereby displacing the film into the container, the displacement mechanism being further displaceable from the location proximate the can end to a location outside of the container and configured to displace air from between the film and the sidewall such that the film is coupled to the sidewall;

wherein the displacement mechanism includes a bladder configured to displace the film into the container and configured to be inflated inside the container to displace air from between the film and the sidewall.

16. The apparatus of claim 15, further comprising an adhesive mechanism configured to apply adhesive to one of the sidewall of the container and the first side of the film.

17. The apparatus of claim 15, wherein the film is one of a sheet, a tube, and a bag.

18. The apparatus of claim 15, further comprising a cutting mechanism configured to cut and remove a portion of the film outside the container proximate the first open end.

19. An apparatus for applying a lining into a metal container, the metal container including a sidewall double-seamed to a can end, the container having a first open end and a second closed end, the apparatus comprising:

a film mechanism configured to provide a film having a first side and a second side opposite the first side; and a film displacement mechanism on the opposite side of the film as the metal container, the film displacement mechanism displaceable from a location outside the metal container through the first open end to a location inside the metal container proximate the can end thereby displacing the film into the container, the displacement mechanism being further displaceable from the location proximate the can end to a location outside of the container and configured to displace air from between the film and the sidewall such that the film is coupled to the sidewall;

wherein the displacement mechanism includes an upper aperture and a lower aperture, the displacement mechanism configured to create a vacuum around at least a portion of the displacement mechanism and to maintain a vacuum proximate the upper aperture while expelling fluid from the lower aperture.

20. An apparatus for applying a lining into a metal container, the metal container including a sidewall double-seamed to a can end, the container having a first open end and a second closed end, the apparatus comprising:

a film mechanism configured to provide a film having a first side and a second side opposite the first side; and a film displacement mechanism on the opposite side of the film as the metal container, the film displacement mechanism displaceable from a location outside the metal container through the first open end to a location inside the metal container proximate the can end thereby displacing the film into the container, the displacement mechanism being further displaceable from the location proximate the can end to a location outside of the container and configured to displace air from between the film and the sidewall such that the film is coupled to the sidewall;

wherein the metal container has a first diameter proximate the can end;

the displacement mechanism includes a flexible radial periphery with a diameter greater than the first diameter in an uncompressed state and a diameter substantially equal to the first diameter in a compressed state; and wherein the displacement mechanism expels air from between the film and the sidewall as the displacement mechanism is displaced from a location proximate the can end to a location proximate the first open end of the container.

21. A method of providing a can comprising:

providing a metal cylindrical sidewall and a metal can end double-seamed to the sidewall, the sidewall having an interior surface and an exterior surface and extending from a first open end to a second end closed by the can end, the can end having an interior surface, the sidewall and the can end defining an interior of the container;

providing a liner sheet, the liner sheet having a first surface and a second surface opposite the first surface, a first thickness, a center portion, and a radial periphery;

heating the container;

heating the liner sheet;

providing a displacement mechanism including a liner sheet displacement portion with a bottom portion and a sidewall;

creating a vacuum proximate the liner sheet displacement portion configured to displace the radial periphery of the liner sheet toward the sidewall of the displacement mechanism;

displacing the liner sheet displacement portion and the liner sheet into the interior of the container; and expelling fluid from the liner sheet displacement portion displacing the liner sheet away from the sidewall of the liner sheet displacement portion toward the metal cylindrical sidewall.

22. The method of claim 21, wherein after being displaced by the vacuum, the liner sheet has a second thickness less than the first thickness.

23. The method of claim 21, wherein the liner displacement portion includes an upper aperture defined in the sidewall and a lower aperture defined in the sidewall;

wherein the step of expelling fluid from the liner sheet displacement portion includes maintaining a vacuum proximate the upper aperture while expelling fluid from the lower aperture, then expelling fluid from the upper aperture.

24. The method of claim 21, further comprising applying adhesive to the first surface of the liner sheet before displacing the liner sheet into the interior of the container.

25. The method of claim 21, wherein the liner sheet is BPA-free.

\* \* \* \* \*